United States Patent
Hong et al.

(10) Patent No.: US 10,005,473 B2
(45) Date of Patent: Jun. 26, 2018

(54) STEREO CAMERA, VEHICLE DRIVING AUXILIARY DEVICE HAVING SAME, AND VEHICLE

(71) Applicant: LG ELECTRONICS INC., Seoul (KR)

(72) Inventors: Yunpyo Hong, Seoul (KR); Woonki Park, Seoul (KR); Youngkyung Park, Seoul (KR); Namseoung Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days. days.

(21) Appl. No.: 15/103,451

(22) PCT Filed: Dec. 12, 2014

(86) PCT No.: PCT/KR2014/012292
§ 371 (c)(1),
(2) Date: Jun. 10, 2016

(87) PCT Pub. No.: WO2015/088289
PCT Pub. Date: Jun. 18, 2015

(65) Prior Publication Data
US 2016/0311443 A1    Oct. 27, 2016

(30) Foreign Application Priority Data

Dec. 12, 2013 (KR) .......................... 10-2013-0154953

(51) Int. Cl.
*B60W 50/00* (2006.01)
*H04N 13/00* (2018.01)
(Continued)

(52) U.S. Cl.
CPC ......... *B60W 50/0098* (2013.01); *B60R 11/04* (2013.01); *B60W 10/04* (2013.01);
(Continued)

(58) Field of Classification Search
CPC combination set(s) only.
See application file for complete search history.

(56) References Cited

U.S. PATENT DOCUMENTS 5,572,449 A * 11/1996 Tang .................. B60K 31/0008
                                                  180/170
8,098,276 B2    1/2012 Chang
(Continued)

FOREIGN PATENT DOCUMENTS

EP        2 642 448 A1     9/2013
JP        2013-224920     10/2013
(Continued)

OTHER PUBLICATIONS

International Search Report dated Apr. 7, 2015 for Application No. PCT /KR2014/012292, 4 pages.

*Primary Examiner* — Angela Y Ortiz
*Assistant Examiner* — Edward J Pipala
(74) *Attorney, Agent, or Firm* — Fish & Richardson P.C.

(57) ABSTRACT

The present invention relates to a stereo camera, a vehicle driving assistance device comprising the same, and a vehicle. A stereo camera according to an embodiment of the present invention includes a first lens, a first image sensor to sense a first image including a grey color and a first color on the basis of light which is incident through the first lens, a second lens separated from the first lens by a predetermined distance, and a second image sensor to sense a second image including the grey color and a second color on the basis of light which is incident through the second lens. Accordingly, the stereo camera may acquire a disparity map and a RGB image.

17 Claims, 28 Drawing Sheets

(51) Int. Cl.
*H04N 13/02* (2006.01)
*B60R 11/04* (2006.01)
*B60W 10/04* (2006.01)
*B60W 10/18* (2012.01)
*B60W 10/20* (2006.01)
*B60W 10/22* (2006.01)
*B60W 40/02* (2006.01)
*G06K 9/00* (2006.01)
*G06K 9/62* (2006.01)
*G06T 3/40* (2006.01)
*G06T 7/20* (2017.01)
*G06T 1/00* (2006.01)
*G06T 7/11* (2017.01)
*B60R 11/00* (2006.01)

(52) U.S. Cl.
CPC ............ *B60W 10/18* (2013.01); *B60W 10/20* (2013.01); *B60W 10/22* (2013.01); *B60W 40/02* (2013.01); *G06K 9/00805* (2013.01); *G06K 9/6267* (2013.01); *G06T 1/0007* (2013.01); *G06T 3/4007* (2013.01); *G06T 7/11* (2017.01); *G06T 7/20* (2013.01); *H04N 13/0007* (2013.01); *H04N 13/0239* (2013.01); *H04N 13/0257* (2013.01); *H04N 13/0271* (2013.01); *B60R 2011/0026* (2013.01); *B60R 2300/107* (2013.01); *G06T 2207/10012* (2013.01); *G06T 2207/10024* (2013.01); *G06T 2207/30261* (2013.01); *H04N 2013/0081* (2013.01)

(56) References Cited

U.S. PATENT DOCUMENTS

| | | | | |
|---|---|---|---|---|
| 8,199,228 | B2* | 6/2012 | Masuda | G06T 5/003 348/222.1 |
| 2008/0199069 | A1* | 8/2008 | Schick | G01S 11/12 382/154 |
| 2010/0066811 | A1 | 3/2010 | Chang | |
| 2013/0250065 | A1 | 9/2013 | Aoki | |
| 2013/0250109 | A1* | 9/2013 | Yokota | H04N 5/2254 348/148 |
| 2015/0341620 | A1* | 11/2015 | Han | H04N 5/2355 701/37 |
| 2016/0026880 | A1* | 1/2016 | Lee | G06K 9/00798 382/103 |
| 2016/0152237 | A1* | 6/2016 | Takahashi | B60W 30/02 701/41 |
| 2016/0328619 | A1* | 11/2016 | Yi | G06K 9/00798 |
| 2017/0094258 | A1* | 3/2017 | Cooper | H04N 13/0257 |

FOREIGN PATENT DOCUMENTS

| | | |
|---|---|---|
| JP | 2013-224920 A1 | 10/2013 |
| KR | 10-2000-0061854 | 10/2000 |
| KR | 10-2000-061854 A1 | 10/2000 |
| KR | 10-2008-0022748 | 3/2008 |
| KR | 10-2008-022748 A1 | 3/2008 |
| KR | 10-2010-0019804 | 2/2010 |
| KR | 10-2010-019804 A1 | 2/2010 |
| KR | 10-2012-0077309 | 7/2012 |
| KR | 10-2012-0098107 | 9/2012 |
| KR | 10-2013-0052400 | 5/2013 |
| KR | 10-2013-052400 A1 | 5/2013 |

* cited by examiner

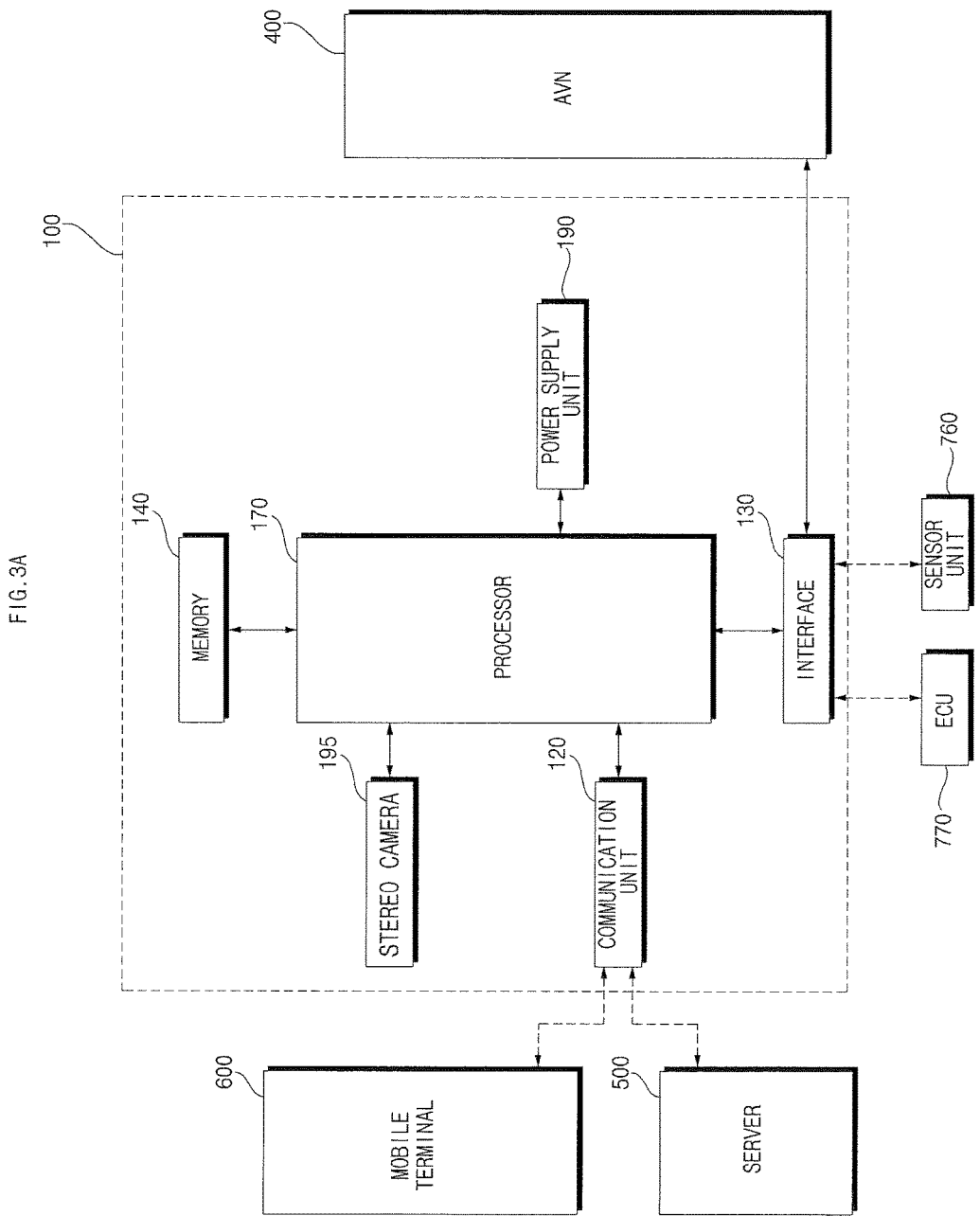

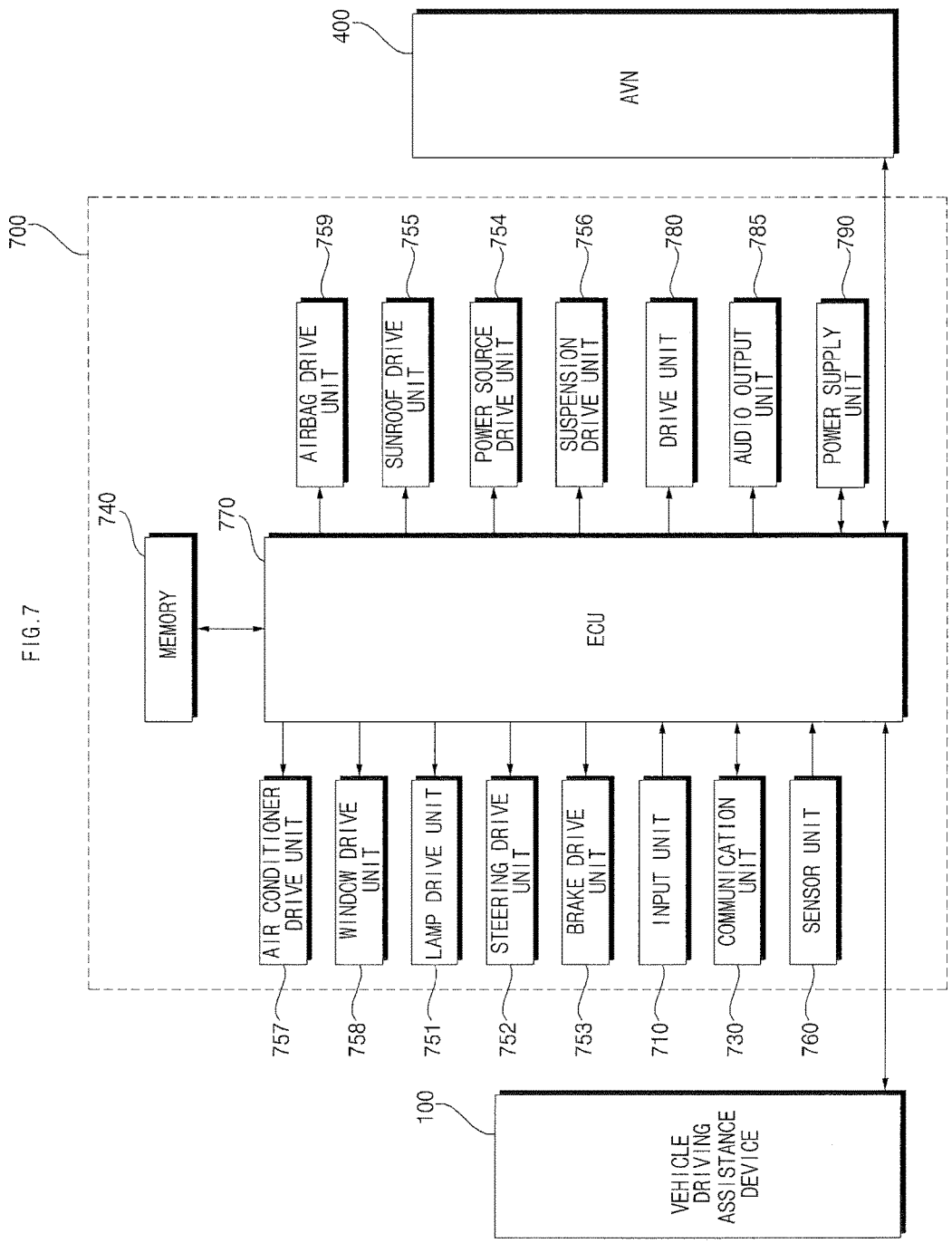

910a

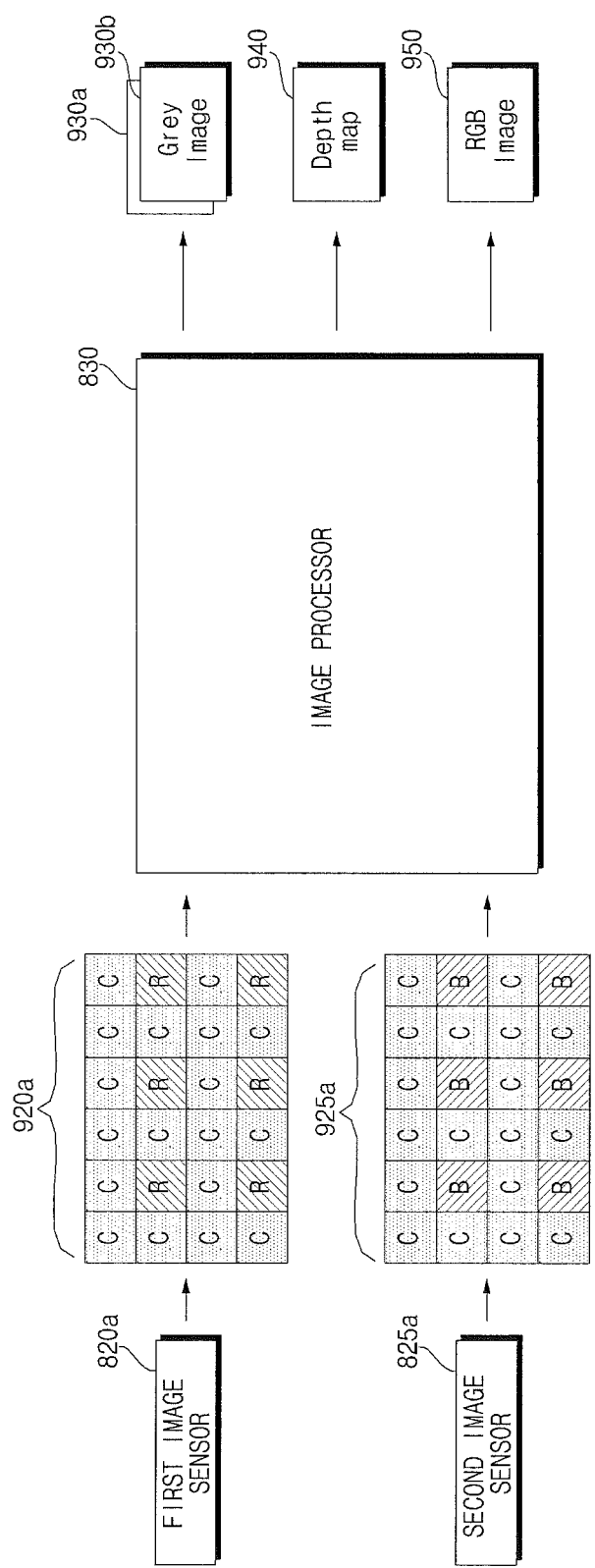

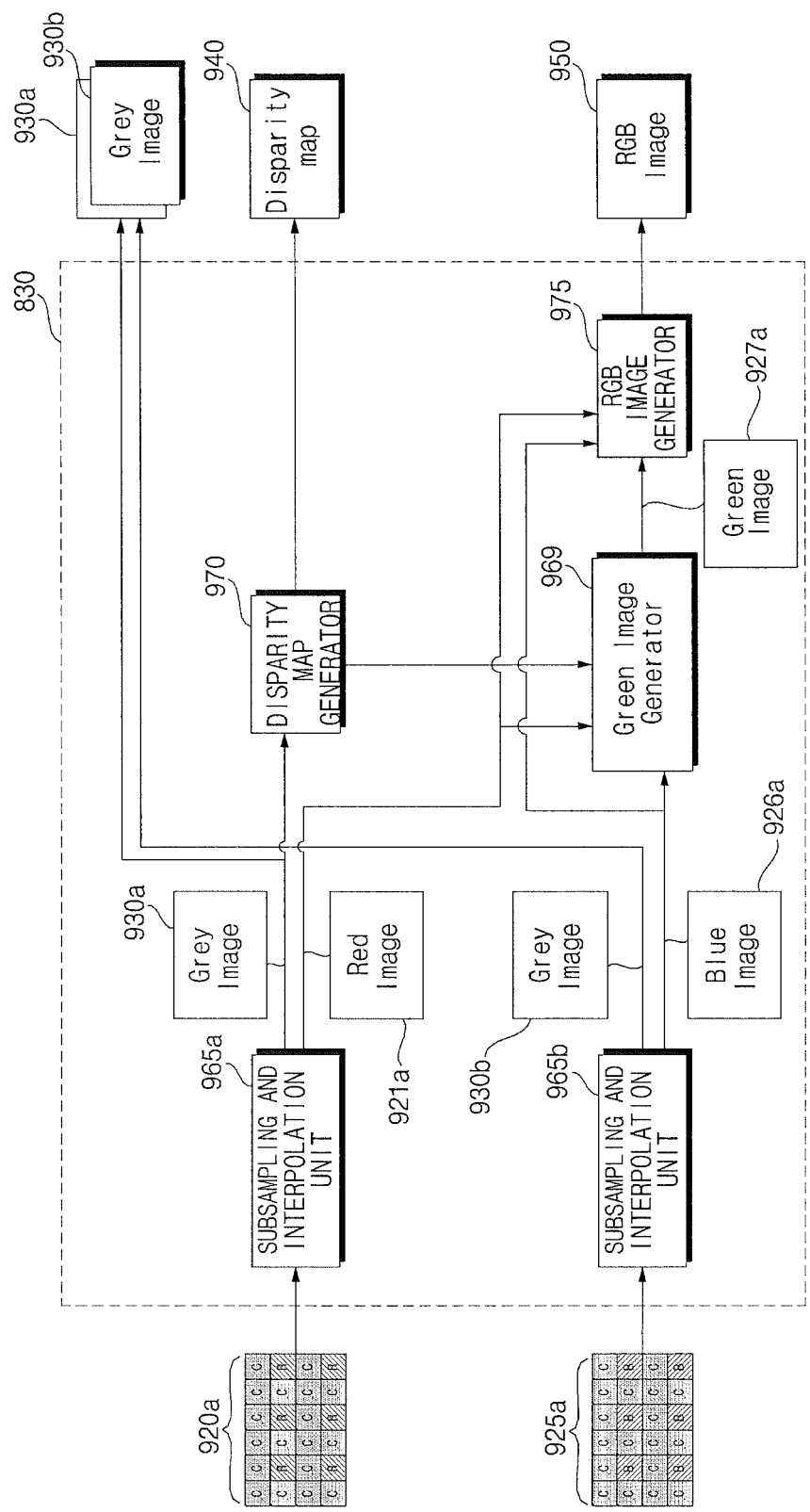

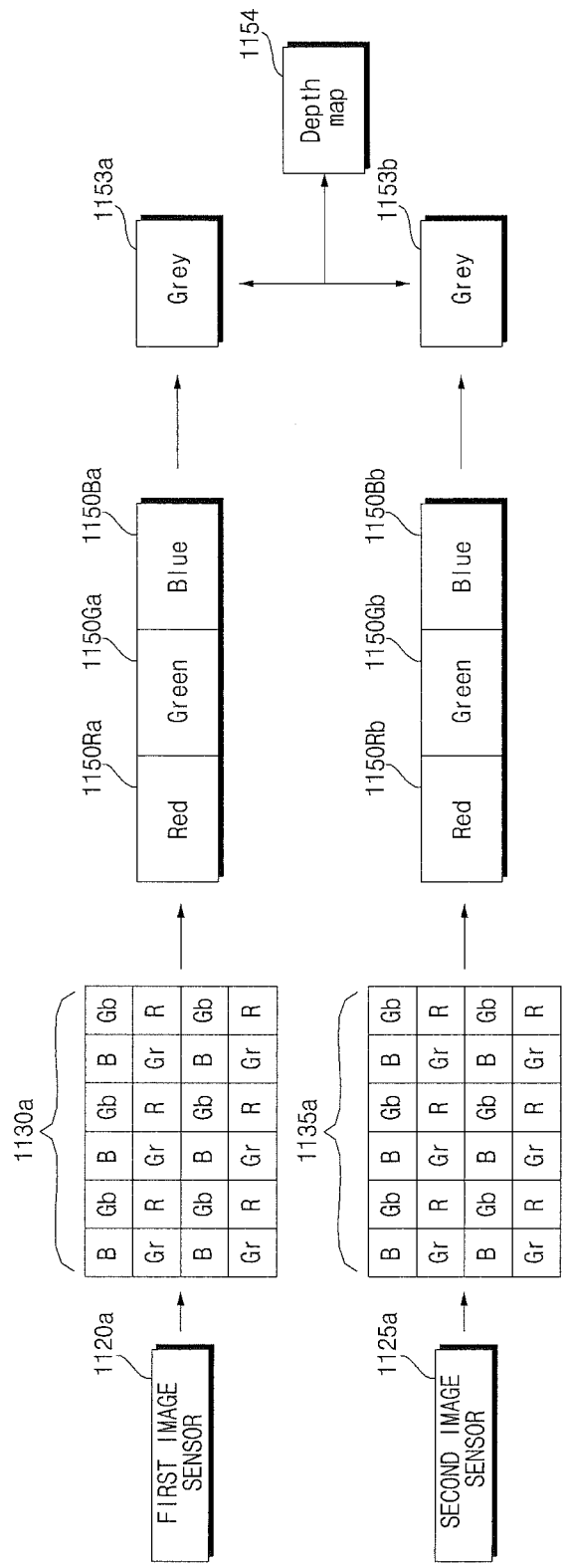

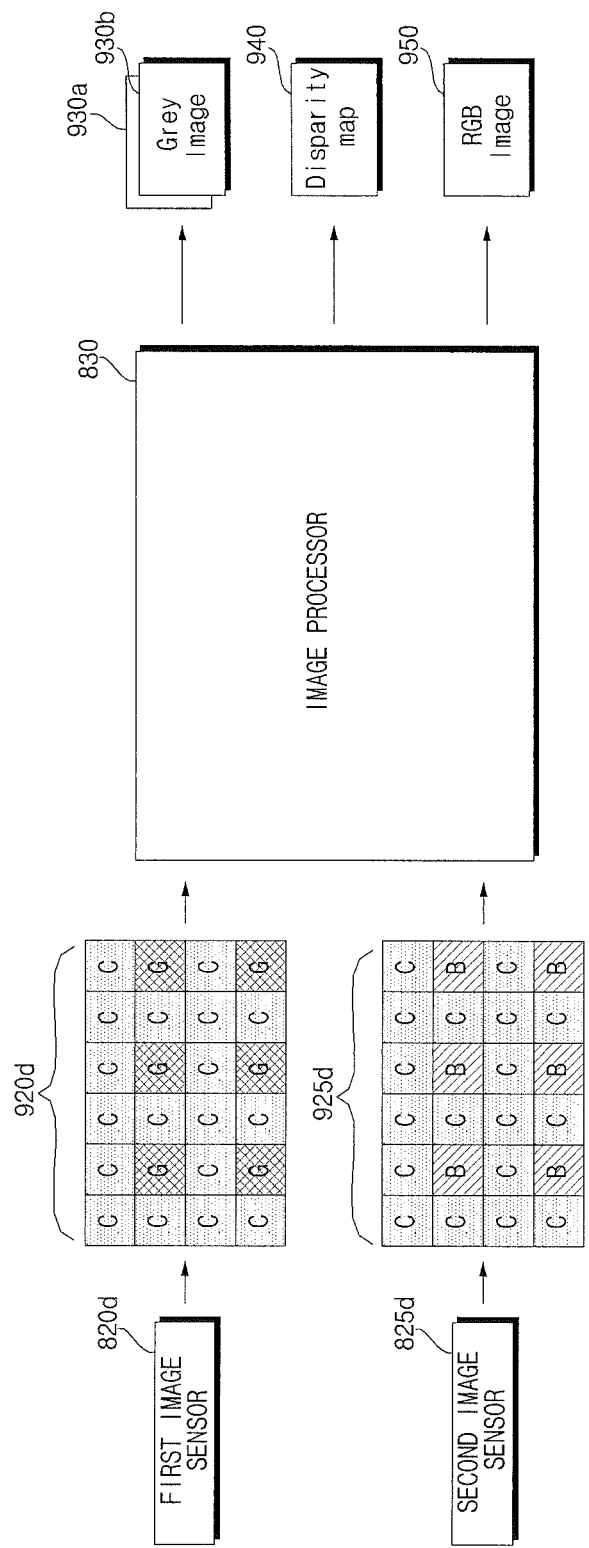

STEREO CAMERA, VEHICLE DRIVING AUXILIARY DEVICE HAVING SAME, AND VEHICLE

CROSS REFERENCE TO RELATED APPLICATIONS

This application is a U.S. National Phase Application under 35 U.S.C. § 371 of International Application PCT/KR2014/012292 filed on Dec. 12, 2014, which claims the benefit of Korean Application No. 10-2013-0154953 filed on Dec. 12, 2013, the entire contents of which are hereby incorporated by reference in their entireties.

BACKGROUND

1. Field of the Invention

The present invention relates to a stereo camera, a vehicle driving assistance device comprising the same, and a vehicle, and more particularly, to a stereo camera capable of acquiring a disparity map and an RGB image, a vehicle driving assistance device comprising the same, and a vehicle.

2. Description of the Related Art

A vehicle is an apparatus that allows a user who rides therein to drive the apparatus in a desired direction. A representative example of the vehicle may be an automobile.

Meanwhile, for convenience of the user who uses the vehicle, the vehicle is provided with, for example, various sensors and electronic devices. In particular, for example, various devices for user driving convenience are being developed.

In particular, up to now, vehicle safety control for preventing accidents while driving a vehicle has been conducted by a driver. However, human recognition ability is restrictive in vehicle safety control under various driving conditions. In particular, when a driver recognizes a front obstacle slightly late while driving on an expressway, a major accident may be caused. Even when a vehicle travels at a low speed, it is difficult to avoid an obstacle which suddenly appears. Efforts for coping with such problems and manufacturing a safer vehicle have been made and a representative method thereof includes an obstacle detection method using an image.

As the obstacle detection method using the image, 2D camera technology of sensing the shape of an object using only one image and performing vehicle safety control cannot easily and accurately acquire information on a distance from the object. Therefore, it is difficult to use this technology in vehicle safety control while a vehicle travels at a high speed.

SUMMARY

An object of the present invention devised to solve the problem lies in a stereo camera capable of acquiring a disparity map and an RGB image, a vehicle driving assistance device comprising the same, and a vehicle.

In accordance with one embodiment of the present invention, the above and other objects can be accomplished by providing a stereo camera including a first lens, a first image sensor to sense a first image including a grey color and a first color based on light incident through the first lens, a second lens spaced part from the first lens by a predetermined distance, and a second image sensor to sense a second image including a grey color and a second color based on light incident through the second lens.

In accordance with one embodiment of the present invention, the above and other objects can be accomplished by providing a vehicle driving assistance device including a stereo camera including a first lens, a first image sensor to sense a first image including a grey color and a first color based on light incident through the first lens, a second lens spaced part from the first lens by a predetermined distance, and a second image sensor to sense a second image including a grey color and a second color based on light incident through the second lens, and a processor to detect a distance from a peripheral vehicle and a lane based on the first image and the second image.

In accordance with one embodiment of the present invention, the above and other objects can be accomplished by providing a vehicle including a sensor unit to sense a vehicle state, a steering drive unit to drive a steering apparatus, a brake drive unit to drive a brake apparatus, a power source drive unit to drive a power source, a suspension drive unit to drive a suspension apparatus, a controller to control the steering drive unit, the brake drive unit, the power source drive unit and the suspension drive unit, and a stereo camera including a first lens, a first image sensor to sense a first image including a grey color and a first color based on light incident through the first lens, a second lens spaced part from the first lens by a predetermined distance, and a second image sensor to sense a second image including a grey color and a second color based on light incident through the second lens.

BRIEF DESCRIPTION OF THE DRAWINGS

FIGS. 3A to 3B are block diagrams showing various examples of the internal configuration of a vehicle driving assistance device according to one embodiment of the present invention.

FIG. 7 is a block diagram showing an example of an electronic control apparatus in the vehicle of FIG. 1.

FIGS. 9B to 9F are views referenced for explanation of FIG. 9A.

FIGS. 10A to 11B are views referenced for comparison with the stereo camera of FIG. 9A.

FIG. 14B is a view referenced for explanation of FIG. 14A.

DETAILED DESCRIPTION

Hereinafter, the embodiments disclosed in the present specification will be described in detail with reference to the accompanying drawings.

With respect to constituent elements used in the following description, suffixes "module" and "unit" are given or mingled with each other only in consideration of ease in preparation of the specification, and do not have or serve as different meanings.

A vehicle as described in this specification may include an automobile and a motorcycle. Hereinafter, an automobile will be focused upon.

A vehicle as described in this specification may include all of a vehicle including an engine, a hybrid vehicle including both an engine and an electric motor, and an electric vehicle including an electric motor. Hereinafter, a vehicle including an engine will be focused upon.

A vehicle driving assistance device as described in this specification may be referred to as an advanced driver assistance system (ADAS) or an advanced driver assistance apparatus (ADAA). Hereinafter, a vehicle driving assistance device and a vehicle comprising the same according to various embodiments of the present invention will be described.

Figure 1:
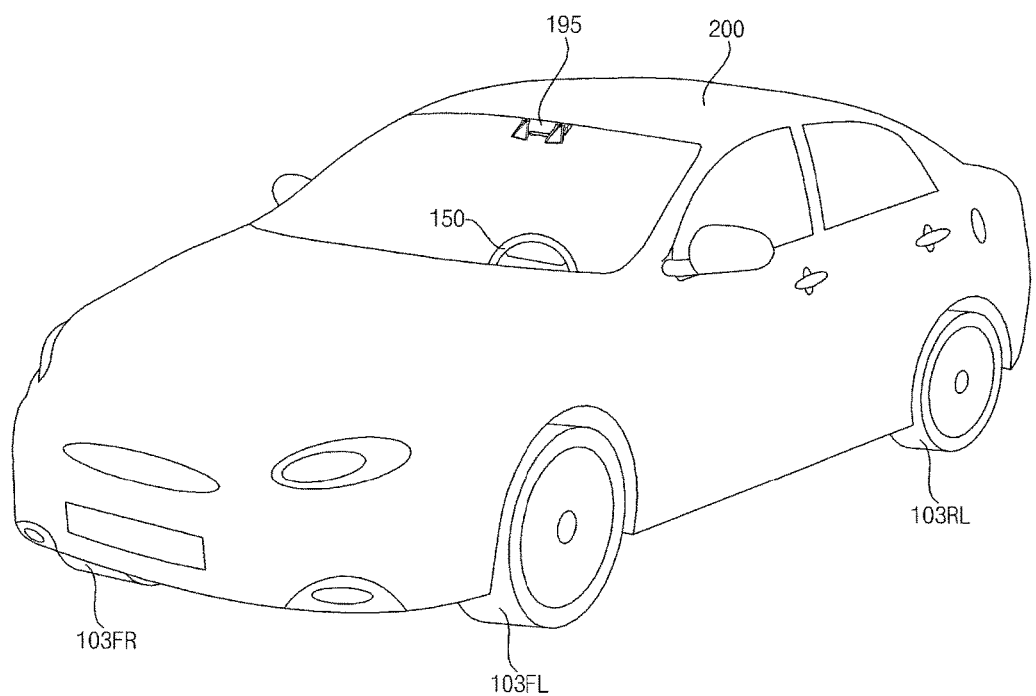
FIG. 1 is a diagram showing the appearance of a vehicle including a stereo camera according to one embodiment of the present invention.

FIG. 1 is a diagram showing the appearance of a vehicle including a stereo camera according to one embodiment of the present invention.

Referring to the figure, a vehicle 200 may include wheels 103FR, 103FL, 103RL, . . . rotated by a power source, a steering wheel 150 for controlling the direction of travel of the vehicle 200, and a stereo camera 195 provided inside the vehicle 200.

The stereo camera 195 may include a plurality of cameras and stereo images acquired by the plurality of cameras may be processed in the vehicle driving assistance device (100 of FIG. 3).

In the figure, the stereo camera 195 includes two cameras.

Figure 2:
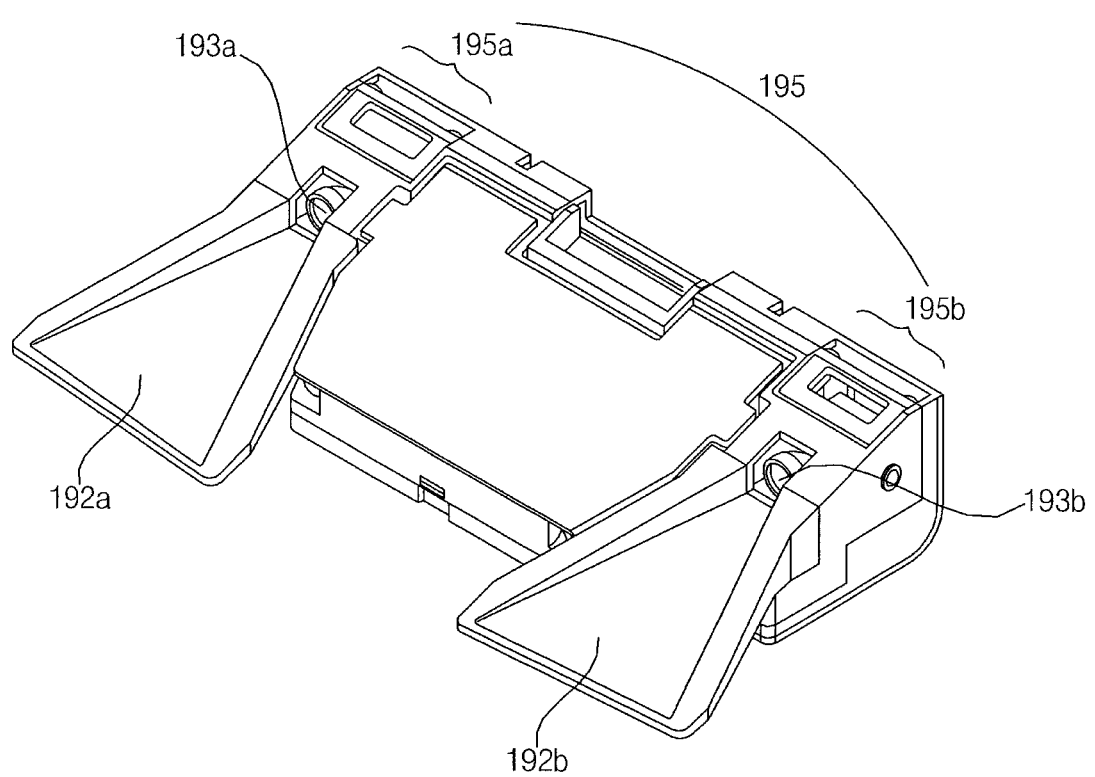
FIG. 2 is a diagram showing the appearance of the stereo camera attached to the vehicle of FIG. 1.

FIG. 2 is a diagram showing the appearance of the stereo camera attached to the vehicle of FIG. 1.

Referring to the figure, the stereo camera module 195 may include a first camera 195a including a first lens 193a and a second camera 195b including a second lens 193b.

The stereo camera module 195 may include first and second light shield units 192a and 192b for shielding light incident on the first and second lenses 193a and 193b.

The stereo camera module 195 of the figure may be attached to and detached from a ceiling or windshield of the vehicle 200.

The vehicle driving assistance device (100 of FIG. 3) including such a stereo camera module 195 may acquire stereo images of the front side of the vehicle from the stereo camera module 195, perform disparity detection based on the stereo images, perform object detection with respect to at least one stereo image, and continuously track motion of an object after object detection.

Figure 3B:
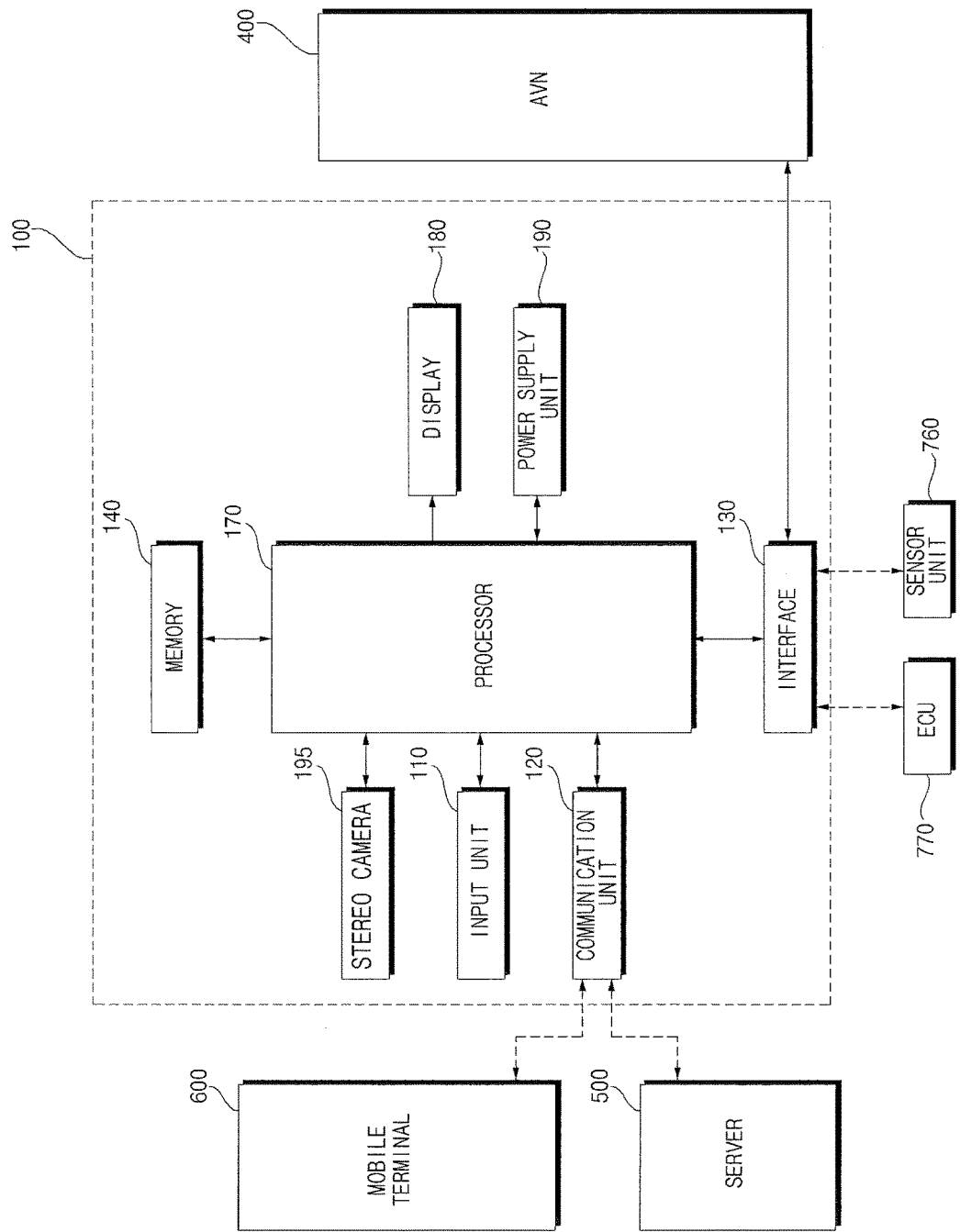

FIGS. 3A to 3B are block diagrams showing various examples of the internal configuration of a vehicle driving assistance device according to one embodiment of the present invention.

The vehicle driving assistance device 100 of FIGS. 3A to 3B may process stereo images received from the stereo camera 195 based on computer vision and generate vehicle related information. Here, the vehicle related information may include vehicle control information for direct control of the vehicle or vehicle driving assistance information for providing a driving guide to a driver.

First, referring to FIG. 3A, the vehicle driving assistance device 100 of FIG. 3A may include a communication unit 120, an interface 130, a memory 140, a processor 170, a power supply unit 190 and a stereo camera 195. In addition, an audio input unit (not shown) and an audio output unit (not shown) may be further included.

The communication unit 120 may exchange data with a mobile terminal 600 or a server 500 in a wireless manner. In particular, the communication unit 120 may exchange data with the mobile terminal of the driver in a wireless manner. The wireless communication method may include various data communication methods such as Bluetooth, Wi-Fi Direct, Wi-Fi or APiX.

The communication unit 120 may receive weather information and road traffic state information, e.g., Transport Protocol Experts Group (TPEG) information, from the mobile terminal 600 or the server 500. In the vehicle driving assistance device 100, real-time traffic information obtained based on the stereo images may be transmitted to the mobile terminal 600 or the server 500.

When a user gets into the vehicle 100, the mobile terminal 600 of the user and the vehicle driving assistance device 100 may pair with each other automatically or as the user executes an application.

The interface 130 may receive vehicle related data or transmit signals processed or generated in the processor 170 to an external device. The interface 130 may perform data communication with an ECU 770, an audio video navigation (AVN) apparatus 400 and a sensor unit 760 using a wired or wireless communication method.

The interface 130 may receive map information related to vehicle traveling through data communication with the AVN apparatus 400.

The interface 130 may receive sensor information from the ECU 770 or the sensor unit 760.

The sensor information may include at least one of vehicle direction information, vehicle position information (GPS information), vehicle angle information, vehicle speed information, vehicle acceleration information, vehicle tilt information, vehicle forward/reverse information, battery information, fuel information, tier information, vehicle lamp information, vehicle interior temperature information, vehicle interior humidity information, etc.

Such sensor information may be acquired from a heading sensor, a yaw sensor, a gyro sensor, a position module, a vehicle forward/reverse sensor, a wheel sensor, a vehicle speed sensor, a vehicle tilt sensor, a battery sensor, a fuel sensor, a tier sensor, a steering sensor based on rotation of the steering wheel, a vehicle interior temperature sensor, a vehicle interior humidity sensor, etc. The position module may include a GPS module for receiving GPS information.

Information related to vehicle traveling, such as vehicle direction information, vehicle position information, vehicle angle information, vehicle speed information and vehicle tilt information, may be referred to as vehicle traveling information.

The memory 140 may store a variety of data for overall operation of the vehicle driving assistance device 100, such as a program for processing or control of the processor 170.

An audio output unit (not shown) converts an electrical signal from the processor 170 into an audio signal and outputs the audio signal. The audio output unit may include a speaker. The audio output unit (not shown) may output sound corresponding to operation of the input unit 110, that is, a button.

An audio input unit (not shown) may receive user voice and may include a microphone. The received voice may be converted into an electrical signal and the electrical signal may be delivered to the processor 170.

The processor 170 controls overall operation of the units of the vehicle driving assistance device 100.

In particular, the processor 170 performs signal processing based on computer vision. The processor 170 acquires the stereo images of the front side of the vehicle from the stereo camera 195, performs disparity calculation with respect to the front side of the vehicle based on the stereo images, performs object detection with respect to at least one of the stereo images based on the calculated disparity information, and continuously tracks motion of an object after object detection.

In particular, the processor 170 may perform lane detection, peripheral vehicle detection, pedestrian detection, traffic sign detection, road surface detection, etc. upon object detection.

The processor 170 may calculate a distance from a detected peripheral vehicle, the speed of the detected peripheral vehicle, a speed difference with the detected peripheral vehicle, etc.

The processor 170 may receive weather information and road traffic state information, e.g., Transport Protocol Experts Group (TPEG) information, through the communication unit 120.

The processor 170 may confirm the traffic condition information in real time based on the stereo images in the vehicle driving assistance device 100.

The processor 170 may receive map information from the AVN apparatus 400 through the interface 130.

The processor 170 may receive sensor information from the ECU 770 or the sensor unit 760 through the interface 130. The sensor information may include at least one of vehicle direction information, vehicle position information (GPS information), vehicle angle information, vehicle speed information, vehicle acceleration information, vehicle tilt information, vehicle forward/reverse information, battery information, fuel information, tier information, vehicle lamp information, vehicle interior temperature information, vehicle interior humidity information, etc.

The power supply unit 190 may supply power required to operate the respective components under the control of the controller 170. In particular, the power supply unit 190 may receive power from, for example, a battery (not illustrated) inside the vehicle 100.

The stereo camera 195 may include a plurality of cameras. Hereinafter, as described with reference to FIG. 2, the stereo camera 195 includes two cameras.

The stereo camera 195 may be attached to or detached from the ceiling or windshield of the vehicle 200 and may include a first camera 195a including a first lens 193a and a second camera including a second lens 193b.

The stereo camera 195 may include first and second light shield units 192a and 192b for shielding light incident on the first and second lenses 193a and 193b.

Next, referring to FIG. 3B, the vehicle driving assistance device 100 of FIG. 3B may further include an input unit 110 and a display 180, as compared to the vehicle driving assistance device 100. Hereinafter, only the input unit 110 and the display 180 will be described.

The input unit 110 may include a plurality of buttons or a touchscreen attached to the vehicle driving assistance device 100 and, more particularly, the stereo camera 195. Through the plurality of buttons or the touchscreen, the vehicle driving assistance device 100 may be powered on. In addition, a variety of input operations may be performed.

The display 180 may display an image related to operation of the vehicle driving assistance device. For image display, the display 180 may include a cluster or a head up display (HUD) located at the internal front side of the vehicle. When the display 180 is a HUD, a projection module for projecting an image on the windshield of the vehicle 200 may be included.

Figure 4A:
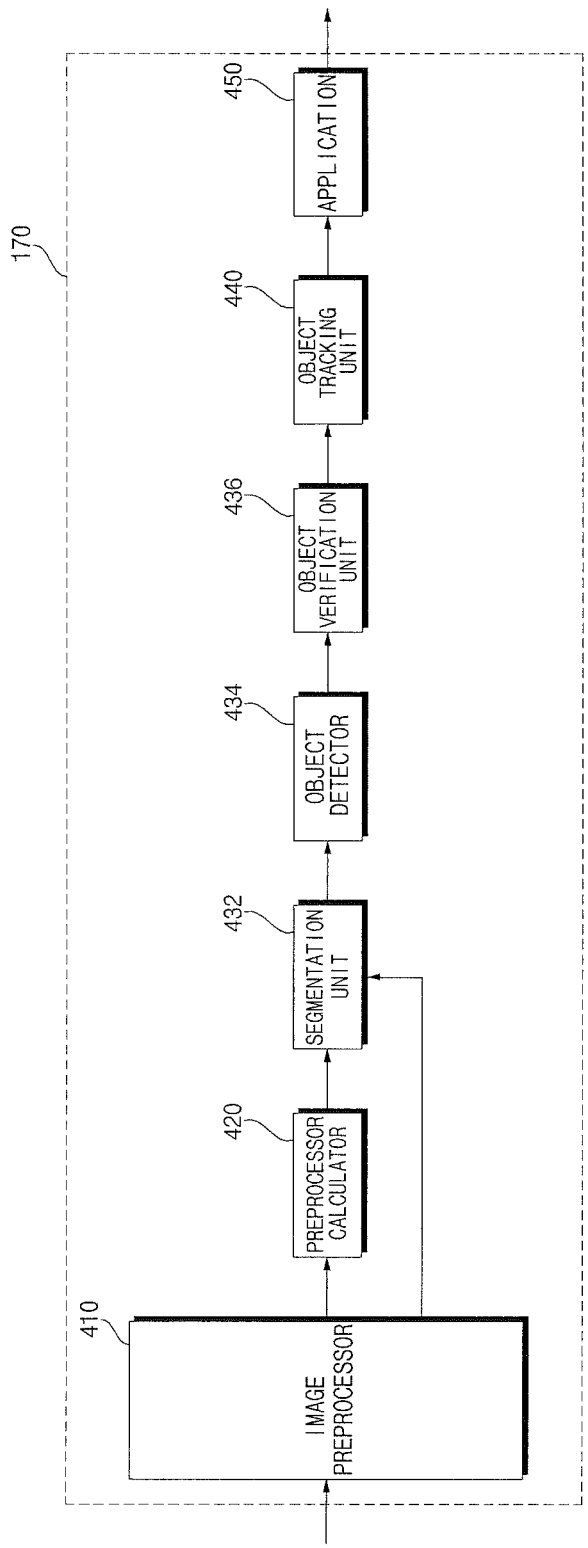
FIGS. 4A to 4B are block diagrams showing various examples of the internal configuration of the processors of FIGS. 3A to 3B.
Figure 4B:
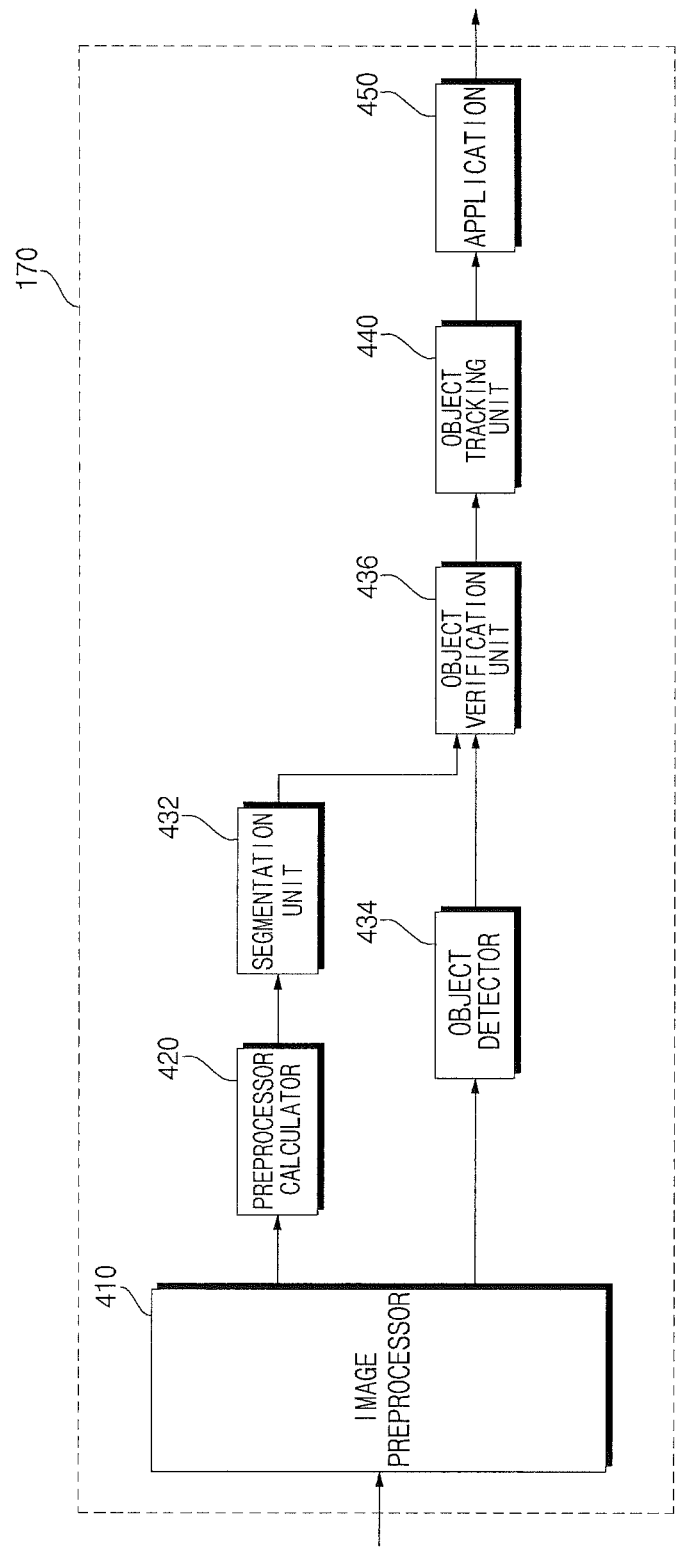

FIGS. 4A to 4B are block diagrams showing various examples of the internal configuration of the processors of FIGS. 3A to 3B, and FIGS. 5A to 5B are diagrams referenced to explain operation of the processors of FIGS. 4A to 4B.

First, referring to FIG. 4A, FIG. 4A is a block diagram showing an example of the internal configuration of the processor 170. The processor 170 of the vehicle driving assistance device 100 may include an image pre-processor 410, a disparity calculator 420, an object detector 434, an object tracking unit 440 and an application 450.

The image preprocessor 410 receives the stereo images from the stereo camera 195 and performs preprocessing.

More specifically, the image preprocessor 410 may perform noise reduction, rectification, calibration, color enhancement, color space conversion (CSC), interpolation, camera gain control, etc. with respect to the stereo image. Therefore, it is possible to acquire stereo images having higher definition than that of the stereo images captured by the stereo camera 195.

The disparity calculator 420 receives the stereo images processed by the image preprocessor 410, performs stereo matching with respect to the received stereo images, and acquires a disparity map according to stereo matching. That is, it is possible to acquire disparity information of the stereo images of the front side of the vehicle.

At this time, stereo matching may be performed in pixel units of the stereo images or predetermined block units. The disparity map may mean a map numerically expressing the binocular parallax information of the stereo images, that is, left and right images.

A segmentation unit 432 may perform segmentation and clustering with respect to at least one of the stereo images based on the disparity information from the disparity calculator 420.

More specifically, the segmentation unit 432 may segment a background and a foreground with respect to at least one of the stereo images based on the disparity information.

For example, a region having disparity information of a predetermined value or less in the disparity map may be calculated as the background and be excluded. Therefore, the foreground may be segmented.

As another example, a region having disparity information of a predetermined value or more in the disparity map may be calculated as the foreground and be extracted. Therefore, the background may be segmented.

The foreground and the background may be segmented based on the disparity information extracted based on the stereo images, thereby reducing a signal processing speed, the amount of processed signals, etc. upon subsequent object detection.

Next, the object detector 434 may detect an object based on image segmentation of the segmentation unit 432.

That is, the object detector 434 may detect an object from at least one of the stereo images based on the disparity information.

More specifically, the object detector 434 may detect the object from at least one of the stereo images. For example, the object may be detected from the foreground segmented by segmentation.

Next, an object verification unit 436 classifies and verifies the segmented objects.

To this end, the object verification unit 436 may use an identification method using a neural network, a support vector machine (SVM) method, an AdaBoost identification method using Haar-like features or a histograms-of-oriented-gradients (HOG) method, etc.

The object verification unit 436 may compare the detected object with the objects stored in the memory 140 to verify the object.

For example, the object verification unit 436 may verify a peripheral vehicle, a lane, a road surface, a traffic sign, a dangerous zone, a tunnel, etc. located in the vicinity of the vehicle.

The object tracking unit 440 tracks the verified object. For example, objects in the sequentially acquired stereo images may be verified, motion or motion vectors of the verified objects may be calculated and movement of the objects may be tracked based on the calculated motion or motion vectors. Therefore, it is possible to track the peripheral vehicle, the lane, the road surface, the traffic sign, the dangerous zone, the tunnel, etc. located in the vicinity of the vehicle.

Next, the application 450 may calculate a degree of danger of the vehicle 200 based on the various objects located in the vicinity of the vehicle, e.g., another vehicle, a lane, a road surface, a traffic sign, etc. In addition, collision with a preceding vehicle or vehicle slipping may be calculated.

The application 450 may output a message indicating such information to a user as vehicle driving assistance information based on the calculated degree of danger, collision with another vehicle or vehicle slipping. Alternatively, a control signal for attitude control or driving control of the vehicle 200 may be generated as vehicle control information.

FIG. 4B is a block diagram showing another example of the internal configuration of the processor.

Referring to the figure, the processor 170 of FIG. 4B is equal to the processor 170 of FIG. 4A except for a signal processing order. Hereinafter, only the difference will be described.

The object detector 434 may receive the stereo images and detect the object from at least one of the stereo images. Unlike FIG. 4A, the object may not be detected from the segmented image but may be directly detected from the stereo images based on the disparity information.

Next, the object verification unit 436 classifies and verifies the image segment from the segmentation unit 432 and the object detected by the object detector 434.

To this end, the object verification unit 436 may use an identification method using a neural network, a support vector machine (SVM) method, an AdaBoost identification method using Haar-like features or a histograms-of-oriented-gradients (HOG) method, etc.

Figure 5A:
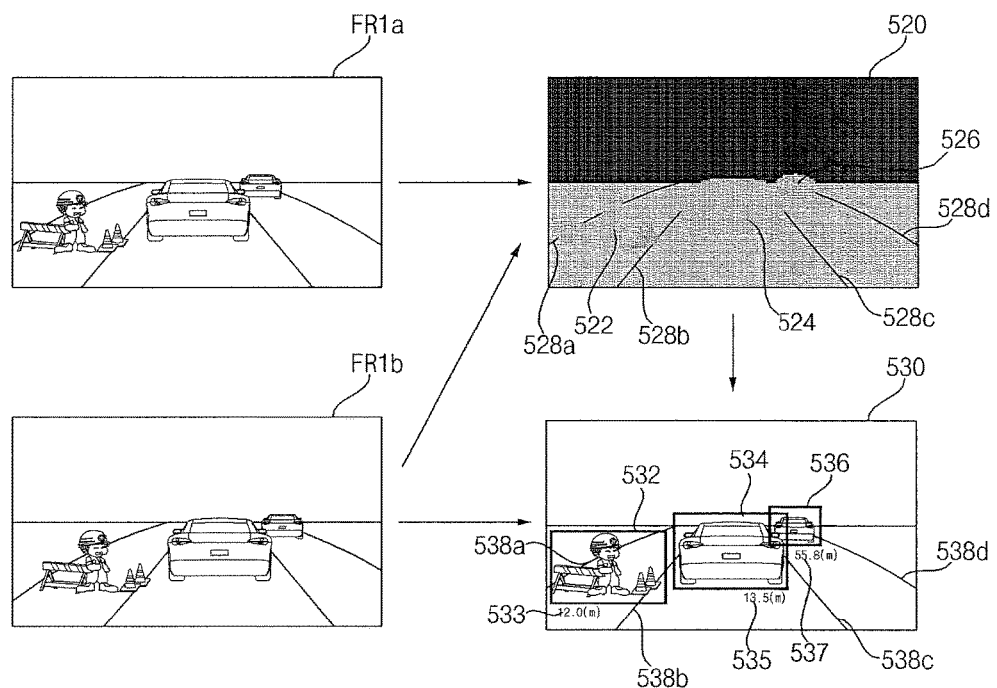
FIGS. 5A to 5B are diagrams referenced to explain operation of the processors of FIGS. 4A to 4B.
Figure 5B:
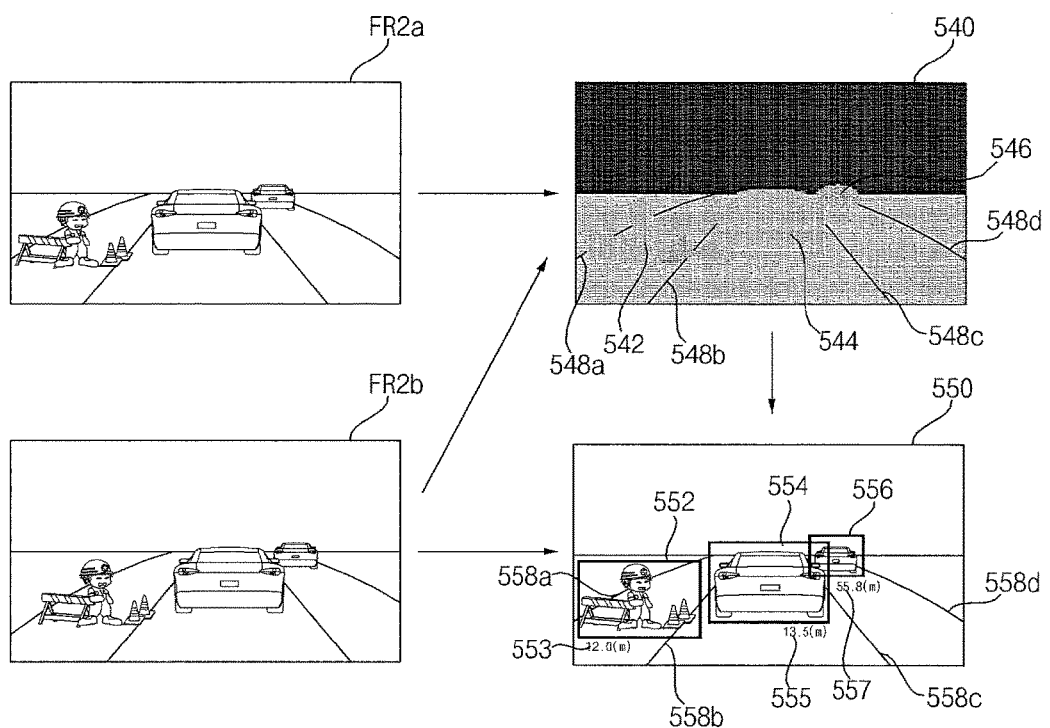

FIGS. 5A and 5B are views referenced to explain operation of the processor 170 of FIG. 4A based on the stereo images acquired during first and second frame periods.

First, referring to FIG. 5A, the stereo camera 195 acquires the stereo images during the first frame period.

The disparity calculator 420 of the processor 170 receives the stereo images FR1*a* and FR1*b* processed by the image preprocessor 410, performs stereo matching with respect to the received stereo images FR1*a* and FR1*b*, and acquires a disparity map 520.

The disparity map 520 expresses the binocular parallax level between the stereo images FR1*a* and FR1*b*. As a disparity level increases, a distance from a vehicle decreases and, as the disparity level decreases, the distance from the vehicle increases.

When such a disparity map is displayed, as the disparity level increases, luminance increases and, as the disparity level decreases, luminance decreases.

In the figure, the disparity map 520 has disparity levels respectively corresponding to first to fourth lanes 528*a*, 528*b*, 528*c* and 528*d*, for example, disparity levels respectively corresponding to a construction area 522, a first preceding vehicle 524 and a second preceding vehicle 526.

The segmentation unit 432, the object detector 434 and the object verification unit 436 may perform segmentation, object detection and object verification with respect to at least one of the stereo images FR1*a* and FR1*b* based on the disparity map 520.

In the figure, object detection and verification are performed with respect to the second stereo image FR1*b* using the disparity map 520.

That is, the first to fourth lanes 538*a*, 538*b*, 538*c* and 538*d*, the construction area 532, the first preceding vehicle 534 and the second preceding vehicle 536 are detected and verified from the image 530 as objects.

Next, referring to FIG. 5B, the stereo camera 195 acquires the stereo images during the second frame period.

The disparity calculator 420 of the processor 170 receives the stereo images FR2*a* and FR2*b* processed by the image preprocessor 410, performs stereo matching with respect to the received stereo images FR2*a* and FR2*b*, and acquires a disparity map 540.

In the figure, the disparity map 540 has disparity levels respectively corresponding to first to fourth lanes 548*a*, 548*b*, 548*c* and 548*d*, for example, disparity levels respectively corresponding to a construction area 542, a first preceding vehicle 544 and a second preceding vehicle 546.

The segmentation unit 432, the object detector 434 and the object verification unit 436 may perform segmentation, object detection and object verification with respect to at least one of the stereo images FR2*a* and FR2*b* based on the disparity map 520.

In the figure, object detection and verification are performed with respect to the second stereo image FR2*b* using the disparity map 540.

That is, the first to fourth lanes 558*a*, 558*b*, 558*c* and 558*d*, the construction area 552, the first preceding vehicle 554 and the second preceding vehicle 556 are detected and verified from the image 550 as objects.

The object tracking unit 440 may track the verified objects by comparing FIG. 5A and FIG. 5B.

More specifically, the object tracking unit 440 may track movement of the objects based on the motion or motion vectors of the objects verified as shown in FIGS. 5A and 5B. Therefore, it is possible to track the lane, the construction area, the first preceding vehicle and the second preceding vehicle located in the vicinity of the vehicle.

Figure 6A:
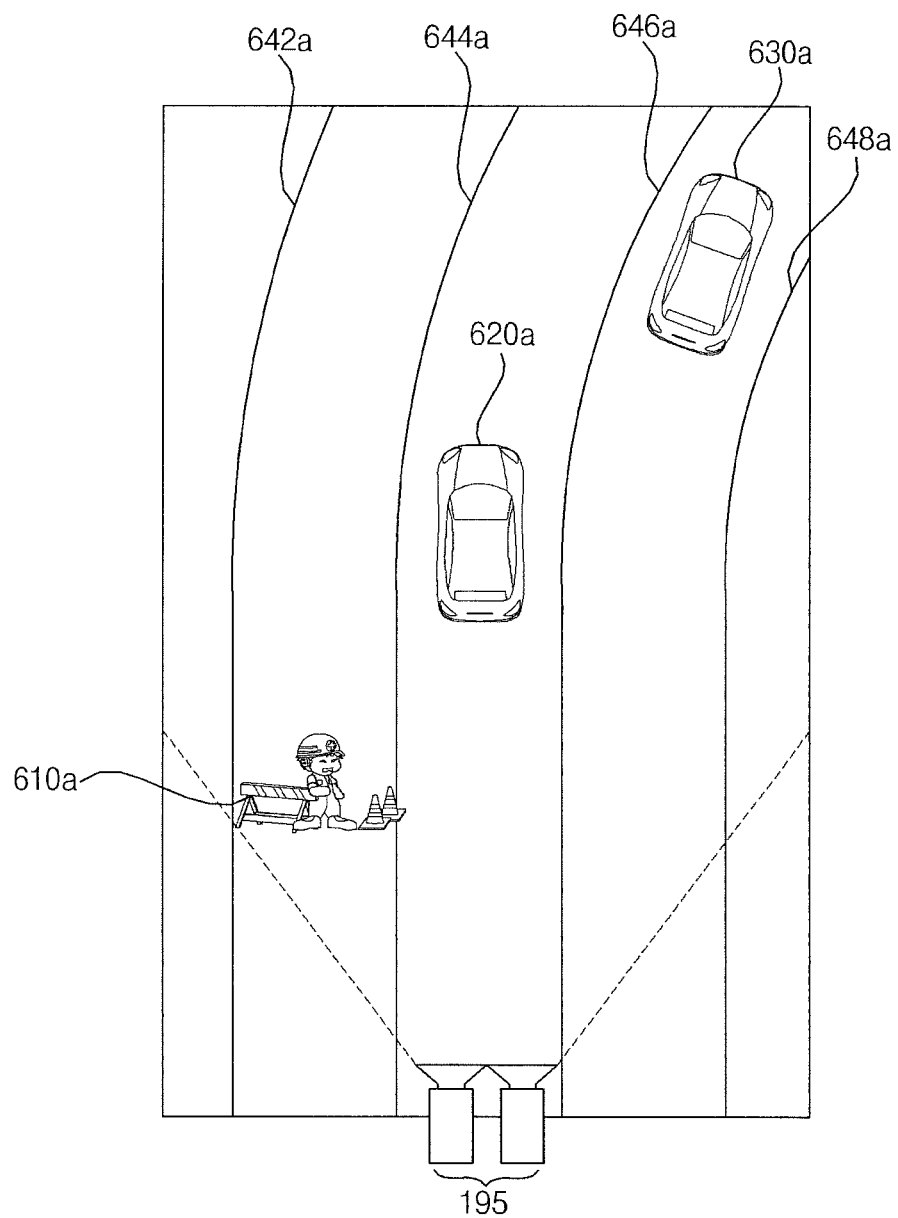
FIGS. 6A to 6B are views referenced to explain operation of the vehicle driving assistance device of FIGS. 3A to 3B.
Figure 6B:
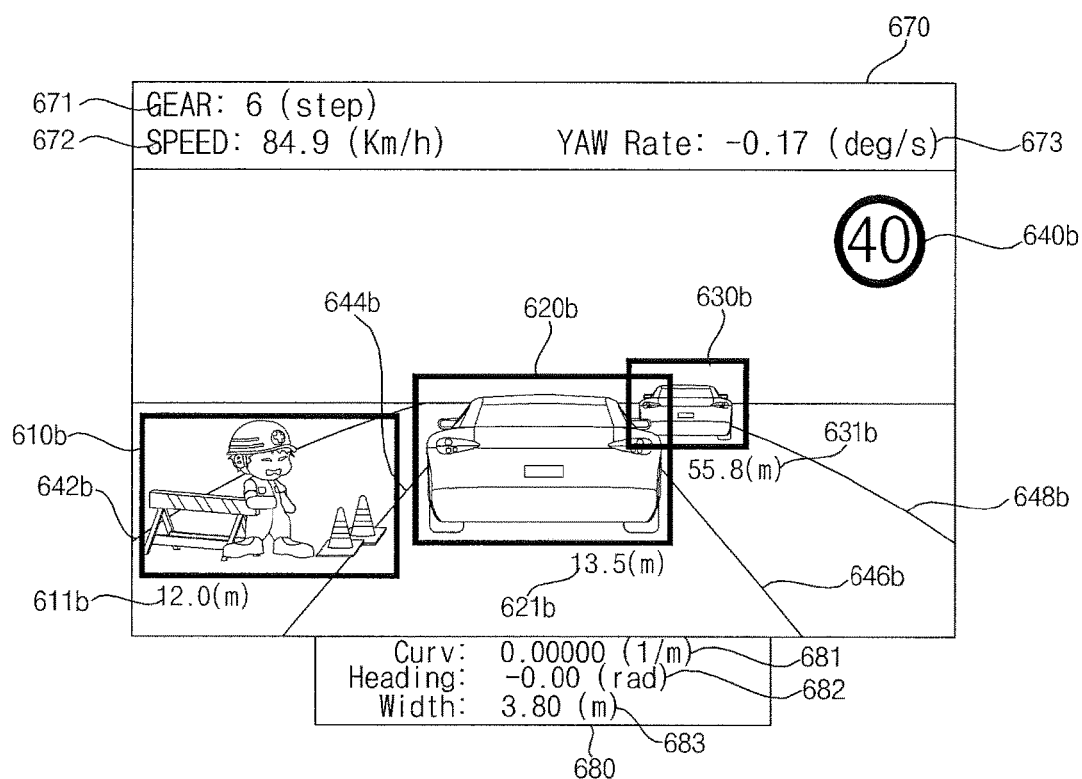

FIGS. 6A to 6B are views referenced to explain operation of the vehicle driving assistance device of FIGS. 3A to 3B.

First, FIG. 6A shows the road conditions at the front side of the vehicle captured by the stereo camera 195 provided in the vehicle. In particular, the road conditions at the front side of the vehicle are shown in a bird's eye view.

Referring to the figure, a first lane 642a, a second lane 644a, a third lane 646a and a fourth lane 648a are sequentially located from the left to the right, a construction area 610a is located between the first lane 642a and the second lane 644a, a first preceding vehicle 620a is located between the second lane 644a and the third lane 646a, and a second preceding vehicle 630a is located between the third lane 646a and the fourth lane 648a.

Next, FIG. 6B shows the condition of the front side of the vehicle grasped by the vehicle driving assistance device along with a variety of information. In particular, the image shown in FIG. 6B may be displayed on the display 180 or the AVN apparatus 400 provided in the vehicle driving assistance device.

In FIG. 6B, information is displayed based on the image captured by the stereo camera 195, unlike FIG. 6A.

Referring to the figure, a first lane 642b, a second lane 644b, a third lane 646b and a fourth lane 648b are sequentially located from the left to the right, a construction area 610b is located between the first lane 642b and the second lane 644b, a first preceding vehicle 620b is located between the second lane 644b and the third lane 646b, and a second preceding vehicle 630b is located between the third lane 646b and the fourth lane 648b.

The vehicle driving assistance device 100 may perform signal processing based on the stereo images captured by the stereo camera 195 and verify the objects of the construction area 610b, the first preceding vehicle 620b and the second preceding vehicle 630b. In addition, the first lane 642b, the second lane 644b, the third lane 646b and the fourth lane 648b may be verified.

The edges of the construction area 610b, the first preceding vehicle 620b and the second preceding vehicle 630b are highlighted in order to show object verification.

The vehicle driving assistance device 100 may calculate information on distances from the construction area 610b, the first preceding vehicle 620b and the second preceding vehicle 630b based on the stereo images captured by the stereo camera 195.

In the figure, first distance information 611b, second distance information 621b and third distance information 631b respectively corresponding to the construction area 610b, the first preceding vehicle 620b and the second preceding vehicle 630b are shown.

The vehicle driving assistance device 100 may receive the sensor information of the vehicle from the ECU 770 or the sensor unit 760. In particular, vehicle speed information, gear information, yaw rate information indicating the rate of the rotation angle (yaw angle) of the vehicle and vehicle angle information may be received and displayed.

Although the vehicle speed information 672, the gear information 671 and the yaw rate information 673 are displayed at the upper side 670 of the front image of the vehicle and the vehicle angle information 682 is displayed at the lower side 680 of the front image of the vehicle in the figure, the present invention is not limited thereto. Vehicle width information 683 and road curvature information 681 may be displayed along with the vehicle angle information 682.

The vehicle driving assistance device 100 may receive speed limit information of a road, on which the vehicle travels, through the communication unit 120 or the interface 130. In the figure, the speed limit information 640b is displayed.

The vehicle driving assistance device 100 may display a variety of information shown in FIG. 6B on the display 180 or store a variety of information without displaying the information. Such information may be used for various applications.

FIG. 7 is a block diagram showing an example of an electronic control apparatus in the vehicle of FIG. 1.

Referring to the figure, the vehicle 200 may include an electronic control apparatus 700 for vehicle control. The electronic control apparatus 700 may exchange data with the vehicle driving assistance device 100 and the AVN apparatus 400.

The electronic control apparatus 700 may include an input unit 710, a communication unit 720, a memory 740, a lamp drive unit 751, a steering drive unit 752, a brake drive unit 753, a power source drive unit 754, a sunroof drive unit, a suspension drive unit 756, an air conditioner drive unit 757, a window drive unit 758, an airbag drive unit 759, a sensor unit 760, an ECU 770, a display unit 780, an audio output unit 785 and a power supply unit 790.

The input unit 710 may include a plurality of buttons or a touchscreen provided inside the vehicle 200. Through the plurality of buttons or the touchscreen, a variety of input operations may be performed.

The communication unit 720 may exchange data with the mobile terminal 600 or the server 500 in a wireless manner. In particular, the communication unit 720 may exchange data with a mobile terminal of a vehicle driver in a wireless manner. A wireless data communication method includes various data communication methods such as Bluetooth, Wi-Fi Direct, Wi-Fi, APiX, etc.

For example, the communication unit 720 may receive weather information and road traffic state information, e.g., Transport Protocol Experts Group (TPEG) information, from the mobile terminal 600 or the server 500.

When a user gets into the vehicle, the mobile terminal 600 of the user and the electronic control apparatus 700 may pair with each other automatically or as the user executes an application.

The memory 740 may store a variety of data for overall operation of the electronic control apparatus 700, such as a program for processing or control of the ECU 770.

The lamp drive unit 751 may turn lamps arranged inside and outside the vehicle on or off. In addition, the lamp drive unit may control, for example, the intensity and direction of light of each lamp. For example, the lamp drive unit may perform control of a turn signal lamp or a brake lamp.

The steering drive unit 752 may perform electronic control of a steering apparatus inside the vehicle 200. The steering drive unit may change the direction of travel of the vehicle.

The brake drive unit 753 may perform electronic control of a brake apparatus (not illustrated) inside the vehicle 200. For example, the brake drive unit may reduce the speed of the vehicle 200 by controlling the operation of brakes located at wheels. In another example, the brake drive unit may adjust the direction of travel of the vehicle 200 leftward or rightward by differentiating the operation of respective brakes located at left and right wheels.

The power source drive unit 754 may perform electronic control of a power source inside the vehicle 200.

For example, in the case where a fossil fuel based engine (not illustrated) is a power source, the power source drive unit 754 may perform electronic control of the engine. Therefore, it is possible to control output torque of the engine.

In another example, in the case where an electric motor (not illustrated) is a power source, the power source drive unit 754 may perform control of the motor. As such, the power source drive unit may control, for example, the RPM and torque of the motor.

The sunroof drive unit 755 may perform electronic control of a sunroof apparatus (not illustrated) inside the vehicle 200. For example, the sunroof drive unit may control opening or closing of a sunroof.

The suspension drive unit 756 may perform electronic control of a suspension apparatus inside the vehicle 200. For example, when a road surface is uneven, the suspension drive unit may control the suspension apparatus to reduce vibration of the vehicle 200.

The air conditioner drive unit 757 may perform electronic control of an air conditioner (not illustrated) inside the vehicle 200. For example, when the interior temperature of the vehicle 200 is high, the air conditioner drive unit may operate the air conditioner to supply cold air to the interior of the vehicle 200.

The window drive unit 758 may perform electronic control of a window apparatus inside the vehicle 200. For example, the window drive unit may control opening or closing of left and right windows of the vehicle 200.

The airbag drive unit 759 may perform the electronic control of an airbag apparatus inside the vehicle 200. For example, the airbag drive unit may control an airbag to be deployed in a dangerous situation.

The sensing unit 760 is configured to sense signals associated with traveling of the vehicle 100. To this end, the sensing unit 760 may include a heading sensor, a yaw sensor, a gyro sensor, a position module, a vehicle forward/reverse sensor, a wheel sensor, a vehicle speed sensor, a vehicle tilt sensor, a battery sensor, a fuel sensor, a tire sensor, a steering sensor based on rotation of the steering wheel, a vehicle interior temperature sensor, a vehicle interior humidity sensor, etc.

As such, the sensing unit 760 may acquire sensing signals with regard to, for example, vehicle traveling direction information, vehicle location information (GPS information), vehicle angle information, vehicle speed information, vehicle acceleration information, vehicle tilt information, vehicle forward/reverse information, battery information, fuel information, tire information, vehicle lamp information, vehicle interior temperature information, vehicle interior humidity information, etc.

Meanwhile, the sensing unit 760 may further include, for example, an accelerator pedal sensor, a pressure sensor, an engine speed sensor, an Air Flow-rate Sensor (AFS), an Air Temperature Sensor (ATS), a Water Temperature Sensor (WTS), a Throttle Position Sensor (TPS), a Top Dead Center (TDC) sensor, and a Crank Angle Sensor (CAS).

The ECU 770 may control overall operation of the units of the electronic control apparatus 700.

The ECU may perform specific operation based on input received through the input unit 710 or receive and transmit the signal sensed by the sensor unit 760 to the vehicle driving assistance device 100, receive map information from the AVN apparatus 400 and control operations of the drive units 751, 752, 753, 754 and 756.

In addition, the ECU 770 may receive weather information and road traffic state information, e.g., Transport Protocol Experts Group (TPEG) information, from the communication unit 720.

The display unit 780 may display an image related to operation of the vehicle driving assistance device. For image display, the display unit 780 may include a cluster or a head up display (HUD) located at the internal front side of the vehicle. When the display unit 780 is a HUD, a projection module for projecting an image onto the windshield of the vehicle 200 may be included. The display unit 780 may include a touchscreen capable of performing an input function.

The audio output unit 785 converts an electrical signal from the ECU 770 into an audio signal and outputs the audio signal. The audio output unit may include a speaker. The audio output unit 785 may output sound corresponding to operation of the input unit 110, that is, a button.

The power supply unit 790 may supply power required to operate the respective components under the control of the ECU 770. In particular, the power supply unit 790 may receive power from, for example, a battery (not illustrated) inside the vehicle.

As described with reference to FIG. 2, the internal structure of the stereo camera 195 for capturing the image of the front side of the vehicle will be described with reference to FIG. 8A and subsequent figures thereof.

Figure 8A:
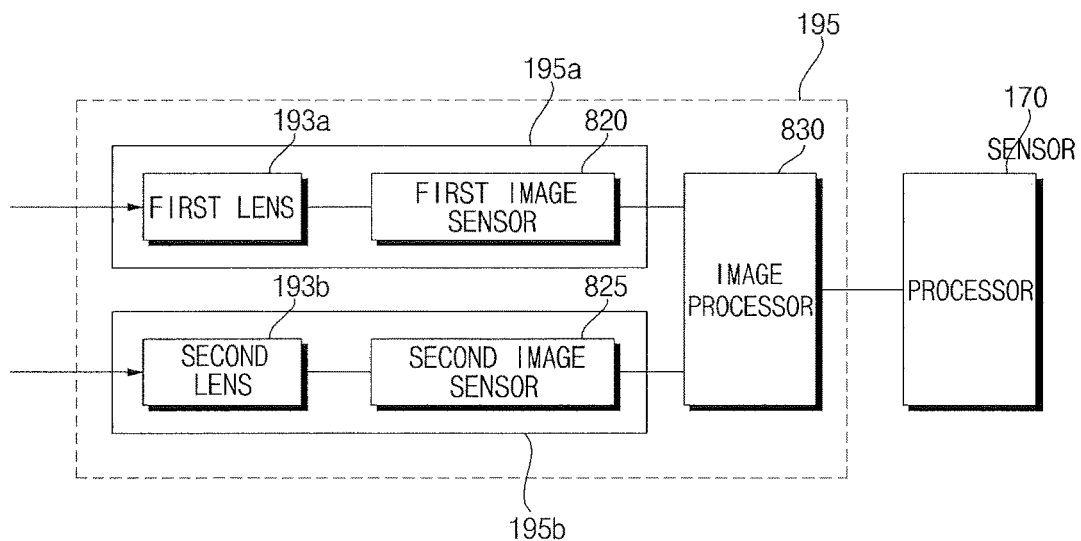
FIG. 8A is a block diagram showing an example of the internal configuration of the stereo camera of FIG. 2.

FIG. 8A is a block diagram showing an example of the internal configuration of the stereo camera of FIG. 2.

Referring to the figure, the stereo camera 195 of FIG. 8 may include a first camera 195a, a second camera 195b and an image processor 830.

The first camera 195a may include a first lens 193a and a first image sensor 820 and the second camera 195b may include a second lens 193b and a second image sensor 825.

The first lens 193a and the second lens 193b may be spaced apart from each other by a distance of about 200 mm to 400 mm.

The image sensor according to the embodiment of the present invention senses an image including all RGB or senses a grey color and any one of RGB.

The colors respectively sensed by first image sensor and the second image sensor may be different from each other.

More specifically, the first image sensor 820 may sense a first image including a grey color and a first color based on light incident through the first lens and the second image sensor 825 may sense a second image including a grey color and a second color based on light incident through the second lens.

For example, the first color may be red R and the second color may be blue B.

In this case, the image processor 830 may receive the first image (grey and red image) and the second image (grey and blue image) and perform image signal processing.

For example, the image processor 830 may interpolate the grey region of the first image and the grey region of the second image and acquire interpolated first and second grey images. The image processor 830 may perform stereo matching with respect to the interpolated first and second grey images to obtain disparity and easily calculate a grey based disparity map based on the disparity.

At this time, the disparity map may mean a map for numerically expressing the binocular parallax information of the stereo images, that is, the left and right images.

The disparity map indicates the level of the binocular parallax between the stereo images. As the disparity level increases, the distance from the vehicle decreases and, as the disparity level decreases, the distance from the vehicle increases.

The image processor 830 may interpolate the red region of the first image and the blue region of the second image and acquire interpolated red and blue images. The image processor 830 may generate a non-sensed green image based on the interpolated red and blue images and the disparity map.

In particular, upon generating the green image, an RGB color space and a YCbCr color space shown in Equation 1 may be used.

$$Y = c_1 \cdot R + c_2 \cdot G + c_3 \cdot B \qquad \text{Equation 1}$$

where, Y denotes a grey (luminance level), R, G and B respectively denote R, G and B levels, and c1, c2 and c3 respectively denote fixed proportional constants. Meanwhile, c1 may have a value of 0.275, c2 may have a value of 0.504 and c3 may have a value of 0.098.

Y is obtained through the disparity map, R is obtained through the red image interpolated based on the first image, and B is obtained through the blue image interpolated based on the second image, thereby calculating G.

Accordingly, the image processor 830 may acquire a green image. The image processor 830 may acquire an RGB image based on the interpolated red image, the interpolated blue image, the acquired green image.

As a result, the image processor 830 may generate and output the disparity map and the RGB image. Therefore, it is possible to acquire a disparity map having improved performance and an RGB image.

Referring to FIG. 8A, the disparity map and the RGB image processed by the image processor 830 may be delivered to the processor 170. The processor 170 need not perform disparity calculation in the disparity calculator 420 described with reference to FIG. 4A and may immediately perform object detection and verification using the disparity map.

Figure 8B:
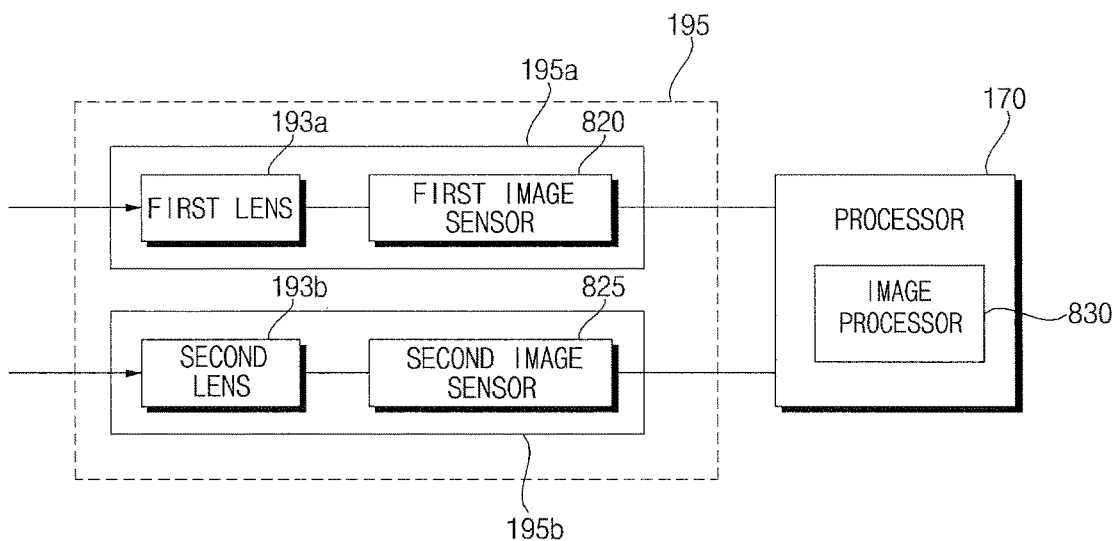
FIG. 8B is a block diagram showing another example of the internal configuration of the stereo camera of FIG. 2.

FIG. 8B is a block diagram showing another example of the internal configuration of the stereo camera of FIG. 2.

The stereo camera 195 of FIG. 8B is similar to the stereo camera 195 of FIG. 8A in that the image processor 830 is not included. That is, the stereo camera 195 of FIG. 8B may include only a first camera 195a and a second camera 195b and the processor 170 may respectively receive a first image (grey and red image) and a second image (grey and blue image) from the first camera 195a and the second camera 195b.

The processor 170 of FIG. 8B may include an image processor 830 shown in FIG. 8A. The processor 170 of FIG. 8B may perform operation of the image processor 830 of FIG. 8A.

For example, the processor 170 may interpolate the grey region of the first image and the grey region of the second image and acquire interpolated first and second grey images. The processor 170 may perform stereo matching with respect to the interpolated first and second grey images to obtain disparity and easily calculate a grey based disparity map based on the disparity.

The processor 170 may respectively interpolate the red region of the first image and the blue region of the second image to acquire interpolated red and blue images. The processor 170 may generate a non-sensed green image based on the interpolated red and blue images and the disparity map.

The processor 170 may acquire an RGB image based on the interpolated red image, the interpolated blue image and the acquired green image.

As a result, the processor 170 may generate the disparity map and the RGB image. Therefore, it is possible to acquire a disparity map having improved performance and an RGB image.

Hereinafter, the image processor 830 receives a first image (grey and red image) and a second image (grey and blue image) and performs signal processing. At this time, the image processor 830 may be the image processor of FIG. 8A or the image processor of the processor 170 of FIG. 8B.

Figure 9A:
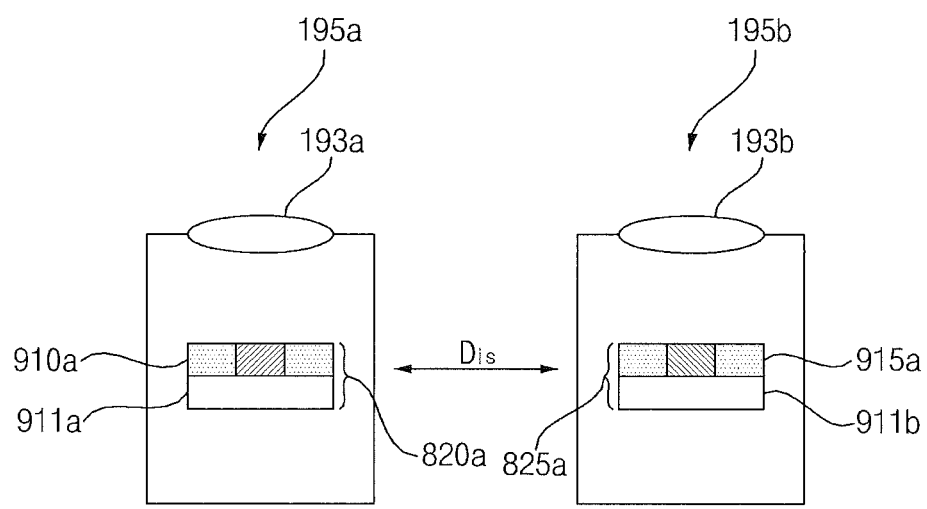
FIG. 9A is a diagram showing a stereo camera according to a first embodiment of the present invention.

FIG. 9A is a diagram showing a stereo camera according to a first embodiment of the present invention, and FIGS. 9B to 9F are views referenced for explanation of FIG. 9A.

First, the stereo camera 900a of FIG. 9A may include a first camera 195a and a second camera 195b, the first camera 195a may include a first lens 820a and a second image sensor 820a, and the second camera 195b may include a second lens 820b and a second image sensor 820b.

The first image sensor 820a may include a clear/red filter 910a and a sensor array 911a for converting a light signal into an electrical signal, in order to sense grey and red colors.

The first image sensor 820a may include a clear/red filter 910a and a sensor array 911a for converting an optical signal into an electrical signal, in order to sense grey and red colors.

The second image sensor 825a may include a clear/blue filter 915a and a sensor array 911b for converting an optical signal into an electrical signal, in order to sense grey and blue colors.

Figure 9B:
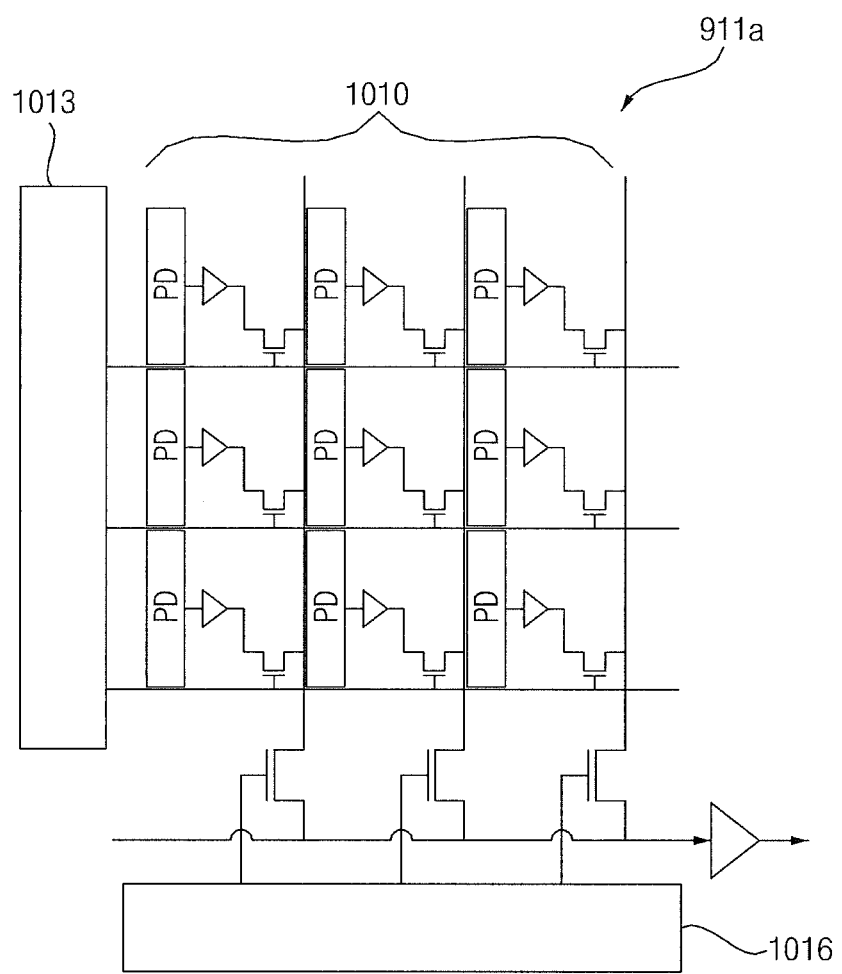

FIG. 9B is a circuit diagram of the first sensor array 911a of FIG. 9A.

Referring to the figure, the first sensor array 911a may include a pixel circuit unit 1010, a row decoder 1013 and a column decoder 106.

In each pixel of the pixel circuit unit 1010, a photodiode for photodetection and circuit elements for transmitting signals detected by the photodiode in row and column directions may be included. An electrical signal sensed by each pixel may be output through the row decoder 1013 and the column decoder 106.

Figure 9C:
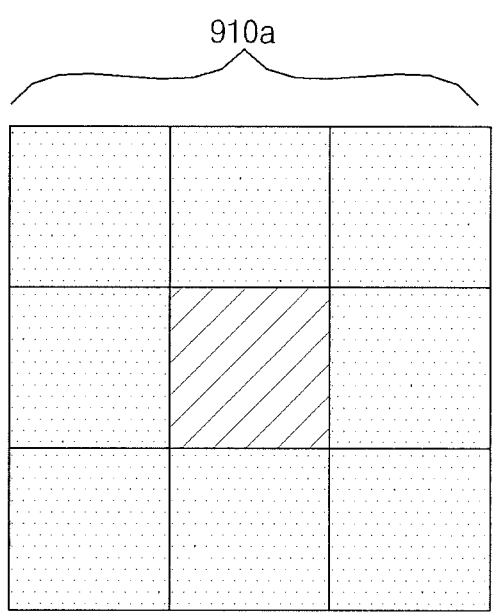

FIG. 9C shows the clear/red filter 910a provided on the first sensor array 911a of FIG. 9B.

The clear/red filter 910a may pass and deliver only grey and red lights of incident lights to the first sensor unit 911a. The clear/red filter 910a is preferably attached to the first sensor array 911a.

Although a pattern in which clear regions (or pixels) surround one red region (or pixel) in the clear/red filter 910a is shown in the figure, various modifications are possible.

For example, a plurality of red regions (or pixels) may be provided in the clear/red filter 910a and the clear region (or pixel) may be provided in the other regions.

Although the clear/red filter 910a having a size of 3×3 is shown in the figure, filters having sizes of 5×5, 7×7, 9×9 and n×n are possible. In this case, at least one red region (or pixel) may be provided in the filter having a size of n×n.

The clear region (or pixel) of the clear/red filter 910a is a region excluding the red region which is a color region and may mean a region without a red filter for sensing a red color, that is, a region without a color filter.

As a result, the first image sensor 820a senses a grey image in correspondence with the clear region of the clear/red filter 910a and senses a red image in correspondence with the red region.

Similarly, a pattern in which clear regions (or pixels) surround one blue region (or pixel) in the clear/blue filter 915a is possible or various modifications are possible. For example, a plurality of blue regions (or pixels) may be provided in the clear/blue filter 915a and the clear region (or pixel) may be provided in the other regions.

In addition, the clear/blue filter 915a may have a size of n×n (n=5, 7, 9, . . . ) and at least one blue region (or pixel) may be provided in the filter having a size of n×n.

FIG. 9D is a view referenced for explaining operation of the image processor 830 based on a first image 920a and a second image 925a respectively sensed by the first image sensor 820a and the second image sensor 825a.

Referring to the figure, the first image 920a sensed by the first image sensor 820a includes a grey region and a red region. In the figure, a pattern in which the clear regions (or pixels) C surround the red region (or pixel) R is shown.

The second image 925a sensed by the second image sensor 825a includes a grey region and a blue region. In the figure, a pattern in which the clear regions (or pixels) C surround the blue region (or pixel) B is shown. At this time, the location of the blue region (or pixel) B in the second image 925a may be equal to the location of the red region (or pixel) R in the first image 920a. Thereafter, upon stereo matching of the grey images in the first image 920a and the second image 925a, comparison between the same locations (pixels) is possible and thus disparity information may be rapidly acquired.

The image processor 830 may interpolate the grey region C of the first image 920a and the grey region C of the second image 925a and acquire interpolated first and second grey images 930a and 930b. At least one of the acquired grey images 930a and 930b may be output.

The image processor 830 may perform stereo matching with respect to the interpolated first grey image 930a and the interpolated second grey image 930b to obtain disparity and easily calculate a grey based disparity map based on the disparity.

The image processor 830 may generate a non-sensed green image based on the red region R of the first image 920a, the blue region B of the second image 925a and the disparity map. In particular, using Equation 1, the non-sensed green image may be generated.

The image processor 830 may acquire an RGB image 950 based on the red region R of the first image 920a, the blue region B of the second image 925a and the acquired green image.

As a result, the image processor 830 may generate and output the disparity map and the RGB image based on the first image 920a and the second image 925a. Therefore, it is possible to more rapidly acquire the disparity map having improved performance and the RGB image 950.

Figure 9E:
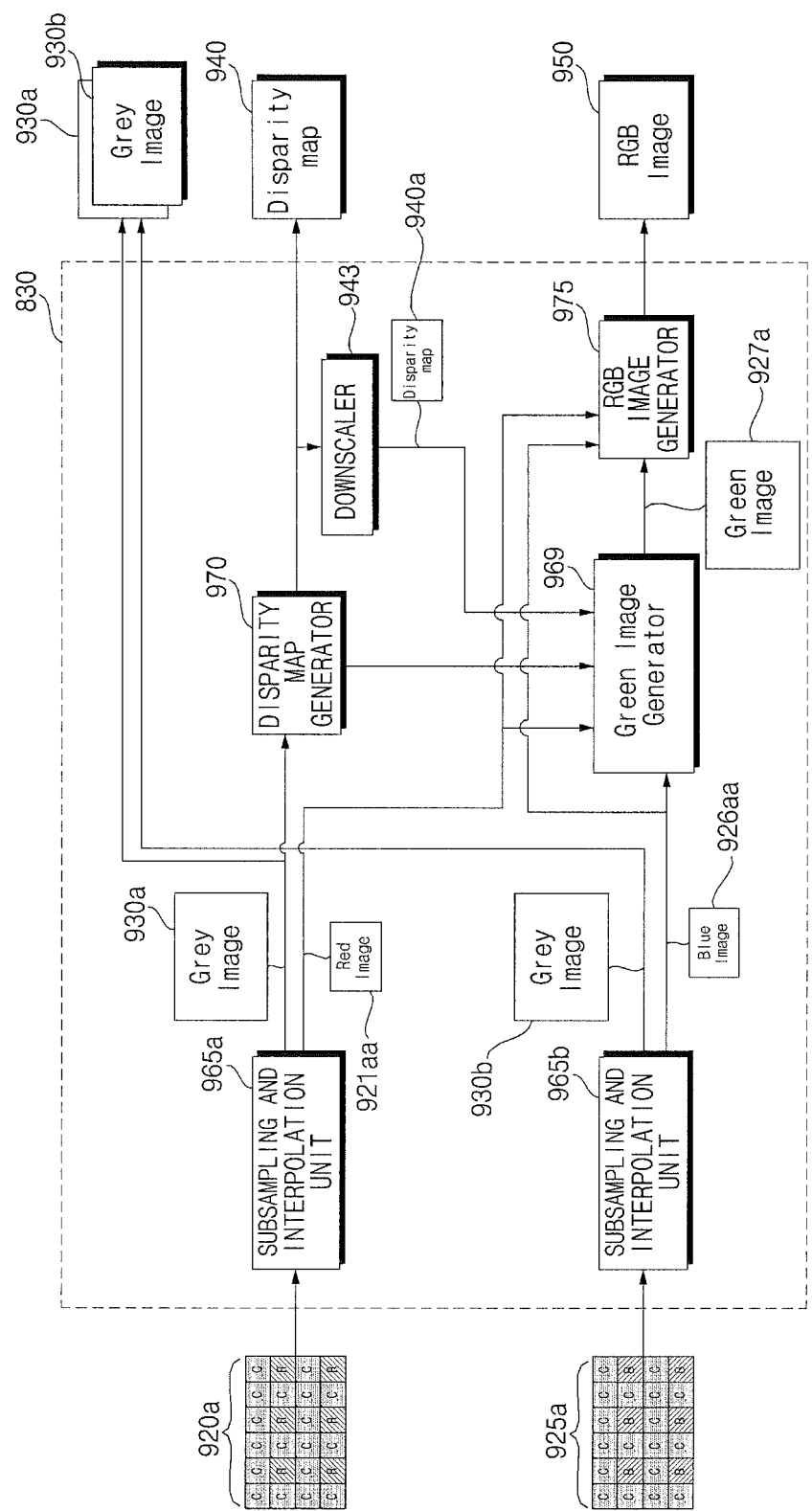

FIG. 9E is a block diagram showing the internal configuration of an example of the image processor of FIG. 9D.

Referring to FIG. 9E, the image processor 830 may include a downscaler 943, a first subsampling and interpolation unit 965a, a second subsampling and interpolation unit 965b, a green image generator 969, a disparity map generator 970 and an RGB generator 975.

The first subsampling and interpolation unit 965a may perform subsampling of the red region of the first image 920a to acquire a red image 921aa, and perform grey interpolation with respect to the grey region to acquire the interpolated first grey image 930a.

Since the red region is ¼ the whole region within the first image 920a, the red image 921aa which is ¼ the first image 920a may be acquired by subsampling. By grey interpolation, the size of the interpolated first grey image 930a may be equal to that of the first image 920a.

The second subsampling and interpolation unit 965b may perform subsampling of the blue region of the second image 925a to acquire a blue image 926aa, and perform grey interpolation with respect to the grey region to acquire the interpolated first grey image 930b.

Since the red region is ¼ the whole region within the second image 925a, the blue image 926aa which is ¼ the first image 925a may be acquired by subsampling.

By grey interpolation, the size of the interpolated second grey image 930b may be equal to that of the second image 925a.

At least one of the first grey image 930a and the second grey image 930b may be output from the image processor 830.

The disparity map generator 970 may perform stereo matching with respect to the interpolated first grey image 930a and the interpolated second grey image 930b and generate a grey based disparity map 940 based on disparity information between the interpolated first grey image 930a and the interpolated second grey image 930b according to stereo matching.

The disparity map 940 is used to generate a green image, and the downscaler 943 may be used for matching with the sizes of the blue image 926aa and the red image 921aa.

The downscaler 943 may downscale the disparity map 940 with a ratio of ¼ in consideration of the sizes of the blue image 926aa and the red image 921aa. The downscaled disparity map 940a is input to the green image generator 969.

The green image generator 969 may generate a green image 927a based on the downscaled disparity map 940a, the red image 921aa acquired by subsampling and the blue image 926aa acquired by subsampling.

The RGB generator 975 may generate an RGB image 950 based on the generated green image 927a, the red image 921aa acquired by subsampling and the blue image 926aa acquired by subsampling.

For example, the RGB generator 975 may combine the generated green image 927a, the red image 921aa acquired subsampling and the blue image 926aa acquired by subsampling and generate the RGB image 950.

FIG. 9F is a block diagram showing the internal configuration of another example of the image processor of FIG. 9D.

Referring to FIG. 9F, the image processor 830 may include a first subsampling and interpolation unit 965a, a second subsampling and interpolation unit 965b, a green image generator 969, a display map generator 970 and an RGB generator 975.

The first subsampling and interpolation unit 965a may perform subsampling of the red region of the first image 920a to acquire a red image, perform interpolation with respect to the acquired red image to acquire the interpolated red image 921a, and perform grey interpolation with respect to the grey region to acquire the interpolated first grey image 930a.

By interpolation, the size of the interpolated first grey image 930a and the interpolated red image 921a may be equal to that of the first image 920a.

The second subsampling and interpolation unit 965b may perform subsampling of the blue region of the second image 925a to acquire a blue image, interpolate the acquired blue image to acquire the interpolated blue image 926a, and perform grey interpolation with respect to the grey region to acquire the interpolated first grey image 930b.

By interpolation, the sizes of the interpolated second grey image 930b and the interpolated blue image 926a may be equal to that of the second image 925a. At least one of the first grey image 930a and the second grey image 930b may be output from the image processor 830.

The disparity map generator 970 may perform stereo matching with respect to the interpolated first grey image 930a and the interpolated second grey image 930b and generate a grey based disparity map 940 based on disparity information between the interpolated first grey image 930a and the interpolated second grey image 930b.

The green image generator 969 may generate a green image 927a based on the disparity map 940, the interpolated red image 921a and the interpolated blue image 926a.

The RGB generator may generate the RGB image 950 based on the generated green image 927a, the interpolated red image 921a and the interpolated blue image 926a.

For example, the RGB generator 975 may perform sub-sampling of the generated green image 927a, the interpolated red image 921a and the interpolated blue image 926a and generate an RGB image 950.

When the image processor 835 of FIG. 9E or 9F is included in the processor 170 as shown in FIG. 8B, the first subsampling and interpolation unit 965a and the second subsampling and interpolation unit 965b may be included in or correspond to the image preprocessor 410 of FIG. 4A and the disparity map generator 970 may be included in or correspond to the disparity calculator 420 of FIG. 4A.

The green image generator 969 and the RGB generator 975 of FIG. 9E may be included in or correspond to the disparity calculator 420 of FIG. 4A.

The segmentation unit 432, the object detector 434, the object verification unit 436, the object tracking unit 440 and the application 450 of FIG. 4A perform operation based on the generated RGB image 950 and the generated disparity map 940.

FIGS. 10A to 11B are views referenced for comparison with the stereo camera of FIG. 9A.

Figure 10A:
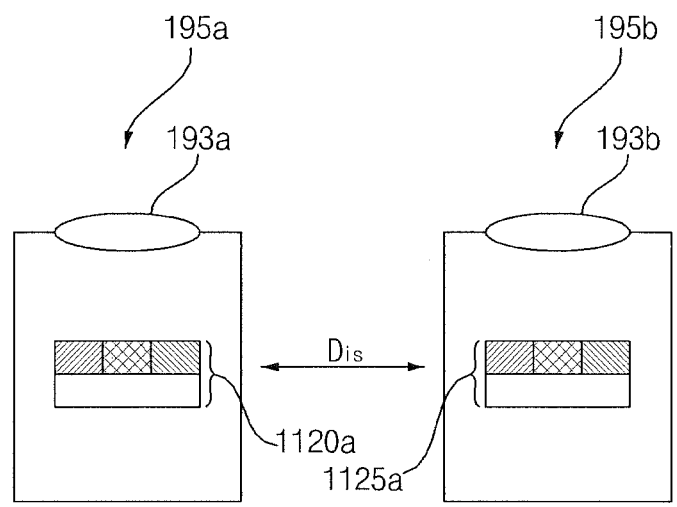

First, FIGS. 10A to 10B show operations for sensing RGB image at the first and second cameras 195a and 195b.

When the first and second cameras 195a and 195b respectively include the first and second lenses 193a and 193b and first and second RGB image sensors 1120a and 1125a, a first RGB image 1130a and a second RGB image 1135a are sensed.

In FIG. 10B, the first RGB image 1130a and the second RGB image 1135a have a Bayer pattern in which R, G and B cross one another.

Disparity map calculation is required to detect the distance with the object in the image. When the first and second cameras 195a and 195b of FIGS. 10A to 10B sense the first RGB image 1130a and the second RGB image 1135a, interpolation is first performed with respect to the first RGB image 1130a and the second RGB image 1135a. The grey images 1153a and 1153b are generated using the interpolated R images 1150Ra and 1150Rb, the interpolated G images 1150Ga and 1150Gb, and the interpolated B images 1150Ba and 1150Bb. Thereafter, a disparity map 1154 is calculated using the grey images 1153a and 1153b.

According to such a method, since image interpolation is first performed to obtain the interpolated R, G and B images and the grey image is generated from the interpolated R, G and B images, blurring and distortion of the image may be generated. Accordingly, it is difficult to obtain an accurate disparity map.

Figure 11A:
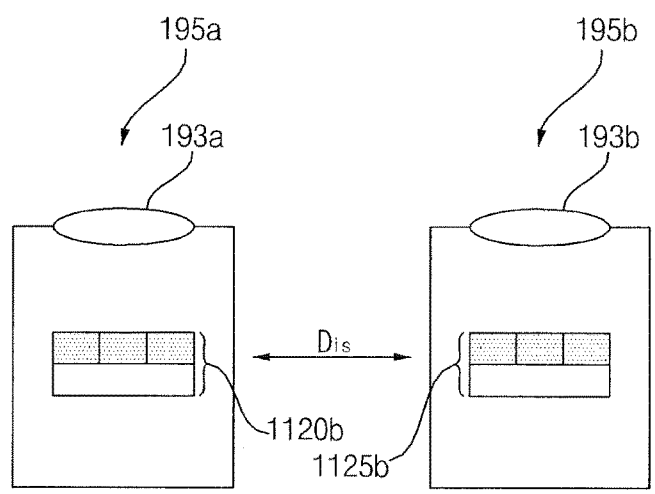
Figure 11B:
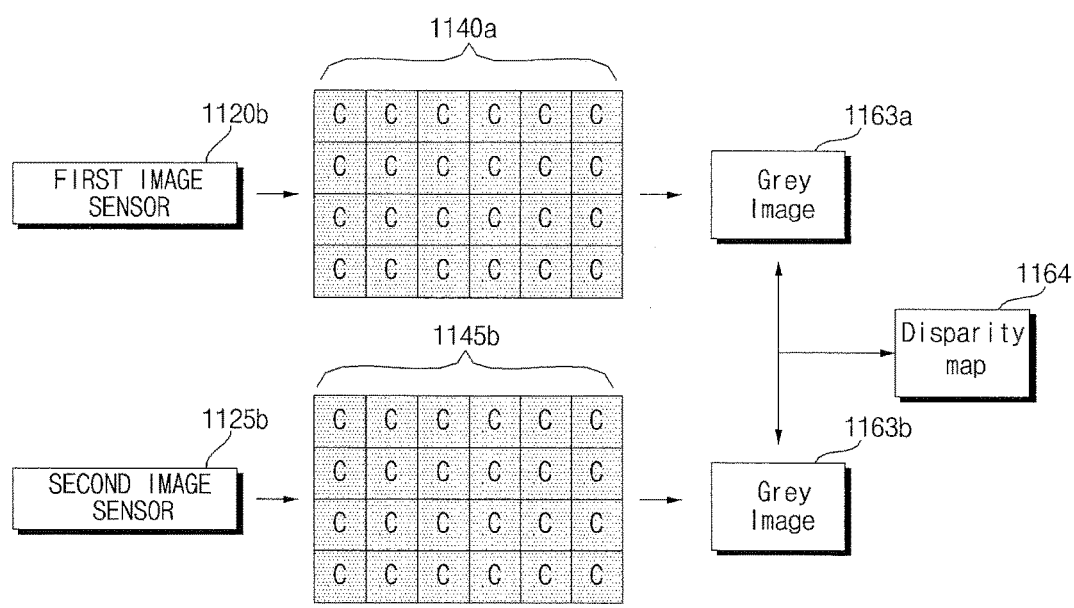

Next, FIGS. 11A to 11B show operation for grey images at the first and second cameras 195a and 195b.

When the first and second cameras 195a and 195b respectively include first and second lens 193a and 193b and first and second grey image sensors 1120b and 1125b, the first grey image 1140a and the second grey image 1145a are sensed.

Disparity map calculation is required to detect the distance with the object in the image. When the first and second cameras 195a and 195b of FIGS. 11A to 11B sense the first grey image 1140a and the second grey image 1145a, a disparity map 1164 may be calculated using the processed first grey image 1163a and the second grey image 1163b through filtering.

According to this method, the disparity map can be rapidly generated but the RGB image cannot be acquired.

However, according to the embodiment of the present invention, that is, according to the method of FIGS. 9A to 9E, since the disparity map is generated using the interpolated first grey image obtained from the first image from the first image sensor 820a and the interpolated second grey image obtained from the second image from the second image sensor 825a, it is possible to rapidly generate the grey based disparity map and to easily generate the RGB image based on the first color of the first image and the second color of the second image.

Hereinafter, stereo cameras according to various embodiments of the present invention will be described.

Figure 12A:
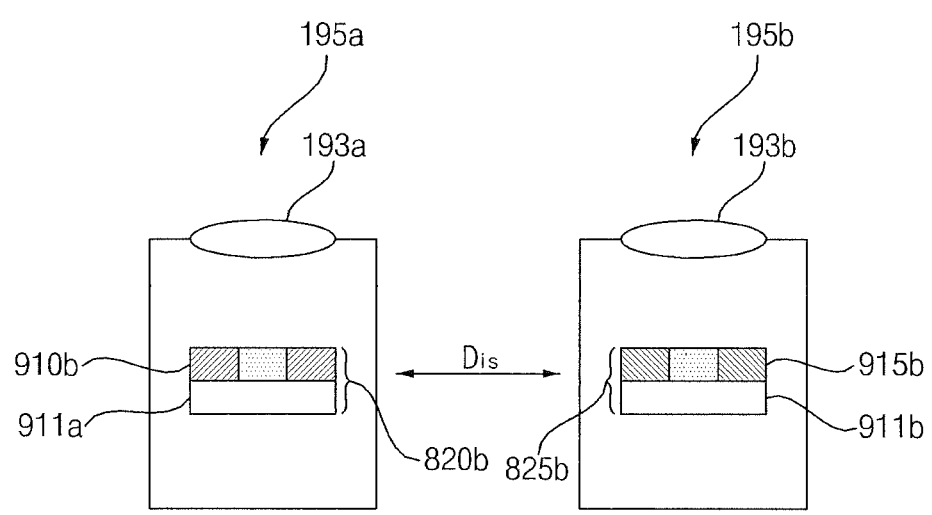
FIG. 12A is a diagram showing a stereo camera according to a second embodiment of the present invention.
Figure 12B:
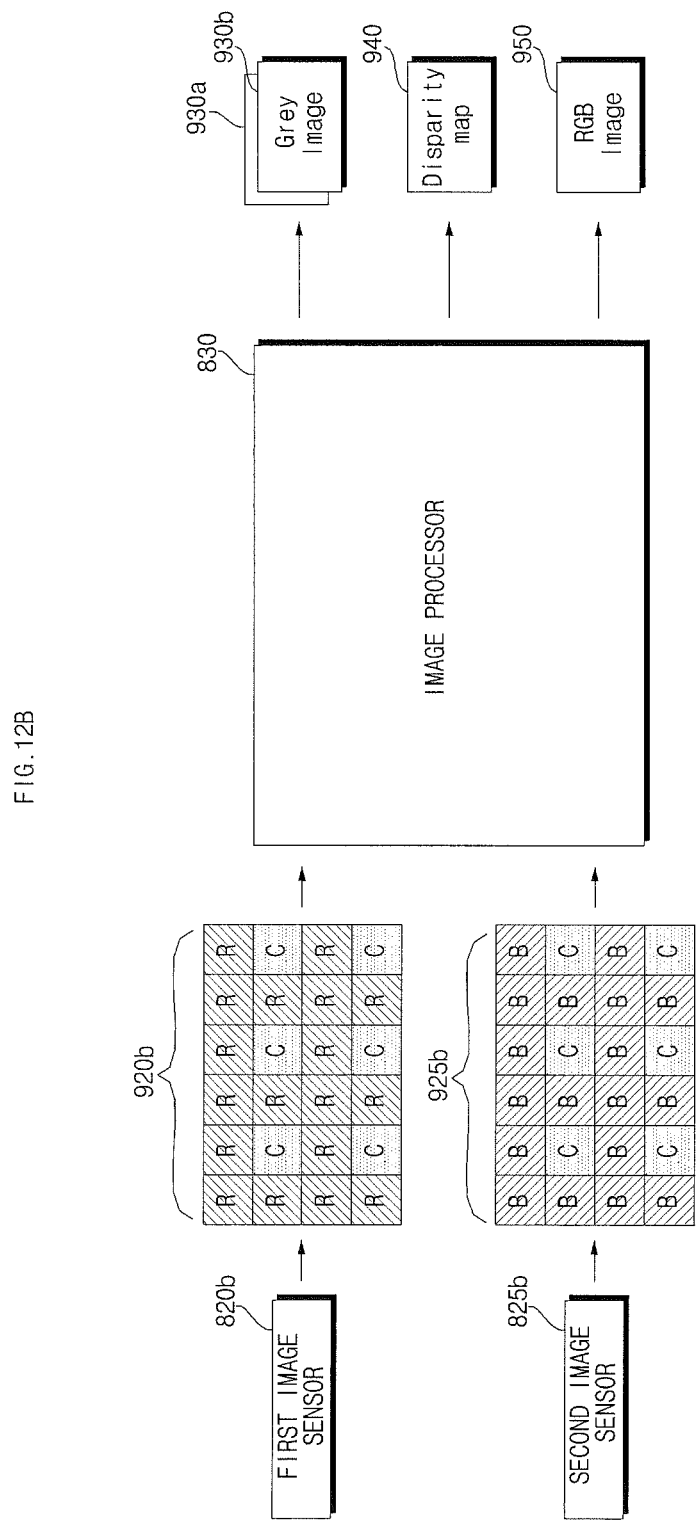
FIG. 12B is a view referenced for explanation of FIG. 12A.

FIG. 12A is a diagram showing a stereo camera according to a second embodiment of the present invention, and FIG. 12B is a view referenced for explanation of FIG. 12A.

Referring to the figure, the stereo camera of FIG. 12A is similar to the stereo camera of FIG. 9A but is different therefrom in filter arrangement of the first camera and the second camera.

The difference will be focused upon. The first camera 195a of FIG. 12A includes a first image sensor 820b and the second camera 195b may include a second image sensor 825b.

The first image sensor 820b may include a red/clear filter 910b and a sensor array 911a for converting a light signal into an electrical signal, in order to sense red and grey colors.

The second image sensor 825b may include a blue/clear filter 915b and a sensor array 911b for converting a light signal into an electrical signal, in order to sense blue and grey colors.

As shown in FIG. 12B, in the first image sensor 820b, the sensed first image 920b may have a pattern in which the red regions (or pixels) R surround the clear region (or pixel) C and, in the second image sensor 825b, the sensed second image 925b may have a pattern in which the blue regions (or pixels) B surround the clear region (or pixel) C.

Thereafter, the image processor 830 may perform signal processing such as interpolation and stereo matching with respect to the sensed first image 920b and the sensed second image 925b and generate the disparity map 940, the interpolated grey images 930a and 930b and the RGB image 950, using the method of FIG. 9E or 9F.

Although, in the figure, color (red or blue) regions surround one clear region in the red/clear filter 910b and the blue/clear filter 915b, various modifications are possible. That is, a plurality of color regions may be arranged in an arbitrary pattern. That is, at least one color region may be provided in a filter having a size of n×n.

Figure 13A:
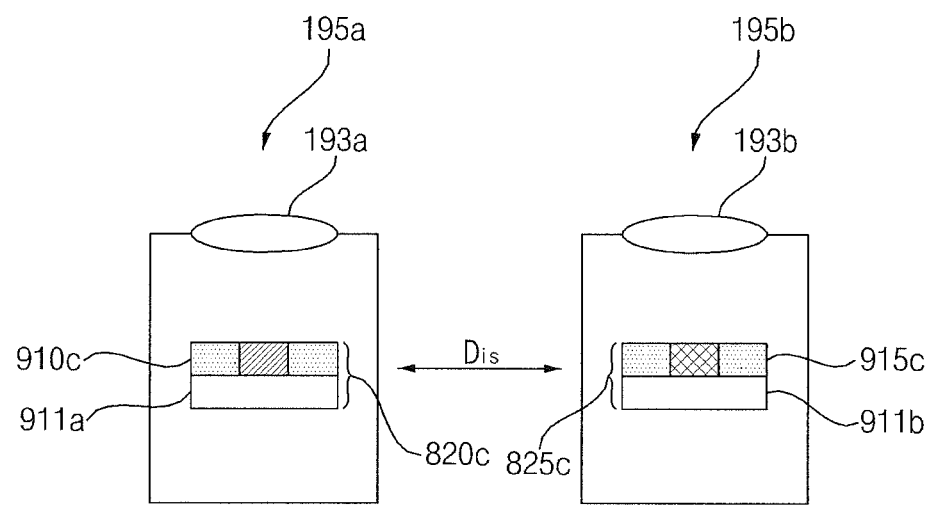
FIG. 13A is a diagram showing a stereo camera according to a third embodiment of the present invention.
Figure 13B:
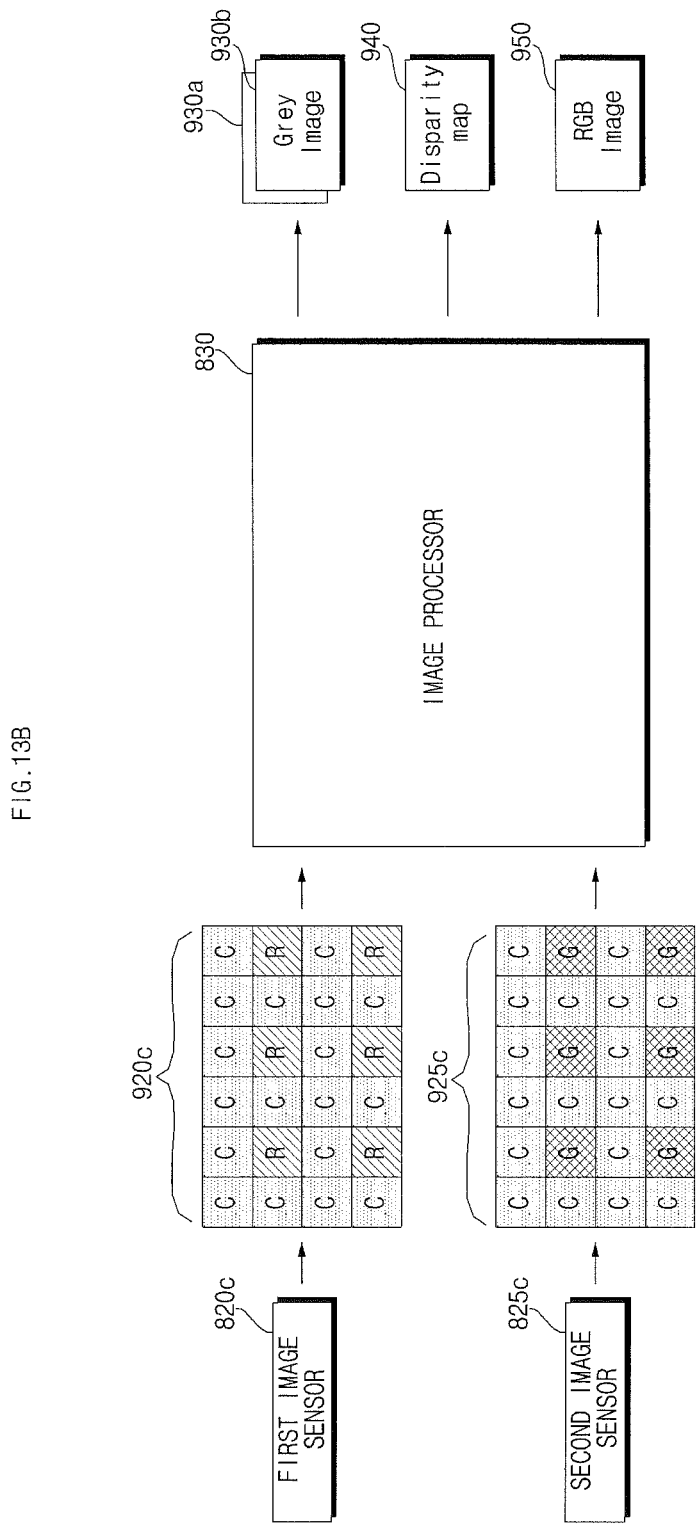
FIG. 13B is a view referenced for explanation of FIG. 13A.

FIG. 13A is a diagram showing a stereo camera according to a third embodiment of the present invention, and FIG. 13B is a view referenced for explanation of FIG. 13A.

Referring to the figure, the stereo camera of FIG. 13A is similar to the stereo camera of FIG. 9A but is different therefrom in filter arrangement of the first camera and the second camera.

The difference will be focused upon. The first camera 195a of FIG. 13A includes a first image sensor 820c and the second camera 195b may include a second image sensor 825c.

The first image sensor 820c may include a clear/red filter 910c and a sensor array 911a for converting a light signal into an electrical signal, in order to sense grey and red colors.

The second image sensor 825c may include a clear/green filter 915c and a sensor array 911b for converting a light signal into an electrical signal, in order to sense grey and green colors.

As shown in FIG. 13B, in the first image sensor 820c, the sensed first image 920c may have a pattern in which the clear regions (or pixels) C surround the red region (or pixel) R and, in the second image sensor 825c, the sensed second image 925c may have a pattern in which the clear regions (or pixels) C surround the green region (or pixel) G.

Thereafter, the image processor 830 may perform signal processing such as interpolation and stereo matching with respect to the sensed first image 920c and the sensed second image 925c and generate the disparity map 940, the interpolated grey images 930a and 930b and the RGB image 950, using the method of FIG. 9E or 9F.

In the clear/red filter 910c and the clear/green filter 915c, as shown in the figure, although the clear regions may surround one color (red or green) region, various modifications are possible. That is, a plurality of color regions may be arranged in an arbitrary pattern. That is, at least one color region may be arranged within a filter having a size of n×n.

Figure 14A:
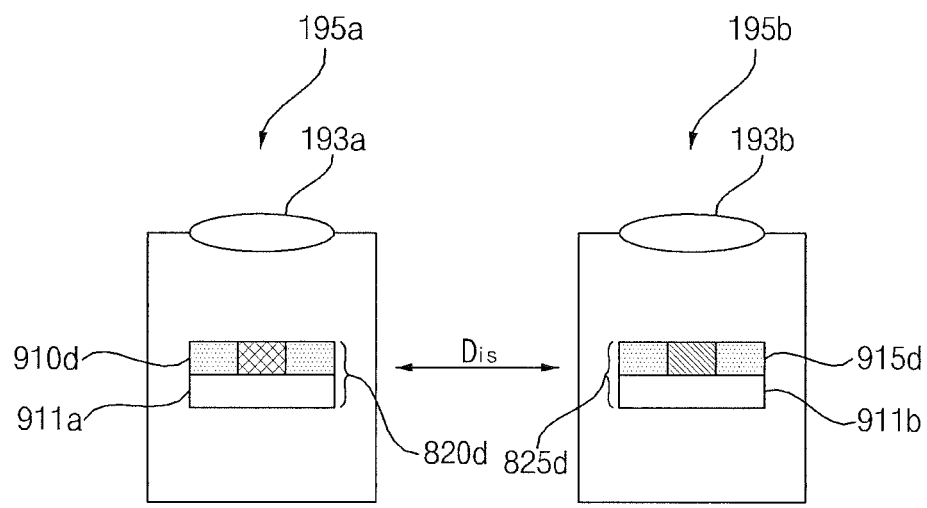
FIG. 14A is a diagram showing a stereo camera according to a third embodiment of the present invention.

FIG. 14A is a diagram showing a stereo camera according to a third embodiment of the present invention, and FIG. 14B is a view referenced for explanation of FIG. 14A.

Referring to the figure, the stereo camera of FIG. 14A is similar to the stereo camera of FIG. 9A but is different therefrom in filter arrangement of the first camera and the second camera.

The difference will be focused upon. The first camera 195a of FIG. 14A includes a first image sensor 820d and the second camera 195b may include a second image sensor 825d.

The first image sensor 820d may include a clear/green filter 910d and a sensor array 911a for converting a light signal into an electrical signal, in order to sense grey and green colors.

The second image sensor 825d may include a clear/blue filter 915d and a sensor array 911b for converting a light signal into an electrical signal, in order to sense grey and blue colors.

As shown in FIG. 14B, in the first image sensor 820d, the sensed first image 920d may have a pattern in which the clear regions (or pixels) C surround the green region (or pixel) G and, in the second image sensor 825d, the sensed second image 925d may have a pattern in which the blue regions (or pixels) B surround the clear region (or pixel) C.

Thereafter, the image processor 830 may perform signal processing such as interpolation and stereo matching with respect to the sensed first image 920d and the sensed second image 925b and generate the disparity map 940, the interpolated grey images 930a and 930b and the RGB image 950, using the method of FIG. 9E or 9F.

In the clear/green filter 910d and the clear/blue filter 915d, as shown in the figure, although the clear regions may surround one color (green or blue) region, various modifications are possible. That is, a plurality of color regions may be arranged in an arbitrary pattern. That is, at least one color region may be arranged in a filter having a size of n×n.

Unlike FIGS. 8A to 14B, the stereo camera may perform filtering such as noise removal with respect to the image sensed by the image sensor and output the filtered image. This will be described with reference to FIG. 15.

Figure 15:
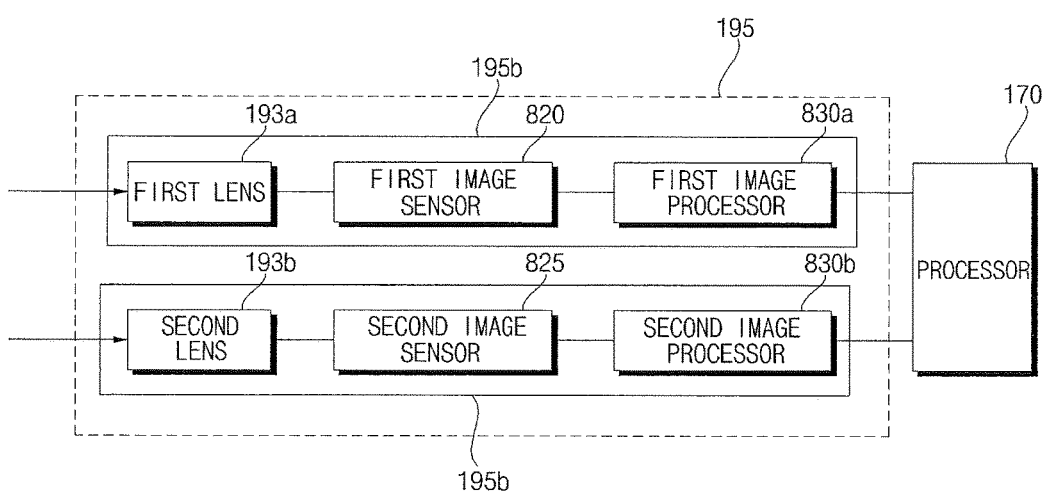
FIG. 15 is a block diagram showing another example of the internal configuration of the stereo camera of FIG. 2.

Referring to the figure, the stereo camera 195 of FIG. 15 is similar to the stereo camera of FIG. 8 but is different therefrom in that the first image processor 830a and the second image processor 830b for performing signaling processing with respect to the first and second images sensed by the first and second image sensors 820 and 825 are included.

The first image processor 830a and the second image processor 830b may perform filtering with respect to the sensed image unlike the image processor 830 described with reference to FIGS. 8A to 14.

In this case, after filtering, image interpolation, stereo matching, and third color image generation may be performed by the processor 170.

Various examples of the stereo camera described with reference to FIGS. 8A to 15 may be included in the vehicle driving assistance device 100 described with reference to FIGS. 3 to 7, such that lane detection, vehicle detection, detection of distance from the vehicle, speed detection, etc. may be possible and vehicle attitude control may be further possible.

In addition, various examples of the stereo camera described with reference to FIGS. 8A to 15 may be included in the vehicle driving assistance device 100 to be mounted in the vehicle 100 or may be mounted in the vehicle 100 separately from the vehicle driving assistance device 100.

As is apparent from the above description, the stereo camera according to the embodiments of the present invention includes a first lens, a first image sensor to sense a first image including a grey color and a first color based on light incident through the first lens, a second lens spaced part from the first lens by a predetermined distance, and a second image sensor to sense a second image including a grey color and a second color based on light incident through the second lens. Accordingly, it is possible to acquire a disparity map having improved performance and an RGB image based on the first image and the second image.

In particular, since the disparity map is generated from the interpolated first grey image obtained by interpolating the first image from the first image sensor and the interpolated second grey image obtained by interpolating the second image from the second image sensor, it is possible to rapidly generate a grey based disparity map and to easily generate an RGB based on the first color in the first image and the second color in the second image.

Upon object detection based on the stereo image, disparity is calculated using the first image and the second image and an object is detected based on disparity information. Accordingly, it is possible to reduce a data processing rate.

The vehicle driving assistance device or the method of operating the vehicle according to the present invention may be implemented as code that can be written to a computer-readable recording medium and can thus be read by a processor. The computer-readable recording medium may be any type of recording device in which data can be stored in a computer-readable manner. Examples of the computer-readable recording medium include a ROM, a RAM, a CD-ROM, a magnetic tape, a floppy disk, optical data storage, and a carrier wave (e.g., data transmission over the Internet). The computer-readable recording medium may be distributed over a plurality of computer systems connected to a network so that computer-readable code is written thereto and executed therefrom in a decentralized manner.

Functional programs, code, and code segments to realize the embodiments herein can be construed by one of ordinary skill in the art.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A stereo camera comprising:
   a first lens;
   a first image sensor configured to sense a first image comprising a grey color and a first color based on light incident through the first lens;
   a second lens spaced part from the first lens by a predetermined distance; and
   a second image sensor configured to sense a second image comprising a grey color and a second color based on light incident through the second lens,
   wherein the first image sensor comprises a first filter configured to pass the grey color and the first color, and the second image sensor comprises a second filter configured to pass the grey color and the second color,
   wherein the first filter comprises a plurality of first clear regions and a plurality of first color regions, and at least some of the plurality of first clear regions surround one of the plurality of first color regions,
   wherein the second filter comprises a plurality of second clear regions and a plurality of second color regions, and at least some of the plurality of second clear regions surround one of the plurality of second color regions, and
   wherein locations of the plurality of second color regions in the second filter correspond to locations of the plurality of first color regions in the first filter.

2. The stereo camera according to claim 1, further comprising an image processor configured to:
   generate a disparity map based on the first image and the second image; and
   generate an RGB image based on the generated disparity map, the first image, and the second image based on the first color being any one of RGB colors and the second color being another of the RGB colors.

3. The stereo camera according to claim 1, further comprising an image processor configured to:
   interpolate a grey image in the first image and acquire the interpolated first grey image,
   interpolate a grey image in the second image and acquire the interpolated second grey image,
   generate a disparity map based on the interpolated first grey image and the interpolated second grey image,
   generate a third color image based on a first color image in the first image, a second color image in the second image, and the disparity map, and
   generate an RGB image based on the first color image, the second color image, and the third color image.

4. The stereo camera according to claim 3, wherein the image processor is configured to:
   downscale the disparity map based on generating the third color image; and
   generate the third color image based on the downscaled disparity map, the first color image in the first image, and the second color image in the second image.

5. The stereo camera according to claim 3, wherein the image processor is further configured to:
   interpolate the first color image in the first image and acquire the interpolated first color image,
   interpolate the second color image in the second image and acquire the interpolated second color image, and
   generate the third color image based on the interpolated first color image, the interpolated second color image, and the disparity map.

6. The stereo camera according to claim 1, further comprising:
   a first image processor configured to interpolate the first image and output the interpolated first grey image and the interpolated first color image; and
   a second image processor configured to interpolate the second image and output the interpolated second grey image and the interpolated second color image.

7. A vehicle driving assistance device comprising:
   a stereo camera comprising:
      a first lens,
      a first image sensor configured to sense a first image comprising a grey color and a first color based on light incident through the first lens,
      a second lens spaced part from the first lens by a predetermined distance, and
      a second image sensor configured to sense a second image comprising a grey color and a second color based on light incident through the second lens; and
   at least one processor configured to detect a distance from a peripheral vehicle and a lane based on the first image and the second image,
   wherein the first image sensor comprises a first filter configured to pass the grey color and the first color, and the second image sensor comprises a second filter configured to pass the grey color and the second color,
   wherein the first filter comprises a plurality of first clear regions and a plurality of first color regions, and at least some of the plurality of first clear regions surround one of the plurality of first color regions,
   wherein the second filter comprises a plurality of second clear regions and a plurality of second color regions, and at least some of the plurality of second clear regions surround one of the plurality of second color regions, and
   wherein locations of the plurality of second color regions in the second filter correspond to locations of the plurality of first color regions in the first filter.

8. The vehicle driving assistance device according to claim 7, wherein the at least one processor is further configured to:
   generate a disparity map based on the first image and the second image; and
   generate an RGB image based on the generated disparity map, the first image, and the second image based on the first color being any one of RGB colors and the second color being another of the RGB colors.

9. The vehicle driving assistance device according to claim 7, wherein the at least one processor is further configured to:
   interpolate a grey image in the first image and acquire the interpolated first grey image,
   interpolate a grey image in the second image and acquire the interpolated second grey image,
   generate a disparity map based on the interpolated first grey image and the interpolated second grey image,
   generate a third color image based on a first color image in the first image, a second color image in the second image, and the disparity map, and generate an RGB image based on the first color image, the second color image, and the third color image.

10. The vehicle driving assistance device according to claim 9, wherein the at least one processor is further configured to:
    downscale the disparity map; and
    generate the third color image based on the downscaled disparity map, the first color image in the first image, and the second color image in the second image.

11. The vehicle driving assistance device according to claim 7, wherein the at least one processor is further configured to:
    interpolate a grey image in the first image and acquire the interpolated first grey image,
    interpolate a grey image in the second image and acquire the interpolated second grey image,
    generate a disparity map based on the interpolated first grey image and the interpolated second grey image,
    interpolate the first color image in the first image and acquire the interpolated first color image,
    interpolate the second color image in the second image and acquire the interpolated second color image, and
    generate a third color image based on the interpolated first color image, the interpolated second color image, and the generated disparity map.

12. The vehicle driving assistance device according to claim 7, wherein the at least one processor further comprises:
    a preprocessor configured to:
        interpolate the first image and acquire the interpolated first grey image; and
        interpolate the second image and acquire the interpolated second grey image; and
    a disparity calculator configured to perform stereo matching with respect to the interpolated first grey image and the interpolated second grey image, and generate a disparity map,
    wherein an RGB image is generated based on the generated disparity map, the first image, and the second image.

13. The vehicle driving assistance device according to claim 12, wherein the at least one processor further comprises:
    an object detector configured to detect an object from the RGB image based on the disparity map; and
    an object tracking unit configured to track the detected object.

14. The vehicle driving assistance device according to claim 13, wherein:
    the at least one processor further comprises :
        a segmentation unit configured to segment an object in the RGB image based on disparity information of the disparity map; and
        an object verification unit configured to classify the detected object,
    wherein the object detector is configured to detect an object from the RGB image based on the segmented object.

15. A vehicle comprising:
    a sensor unit configured to sense a vehicle state;
    a steering drive unit configured to drive a steering apparatus;
    a brake drive unit configured to drive a brake apparatus;
    a power source drive unit configured to drive a power source;
    a suspension drive unit configured to drive a suspension apparatus;
    a controller configured to control the steering drive unit, the brake drive unit, the power source drive unit, and the suspension drive unit; and
    a stereo camera comprising:
        a first lens,
        a first image sensor configured to sense a first image comprising a grey color and a first color based on light incident through the first lens,
        a second lens spaced part from the first lens by a predetermined distance, and
        a second image sensor configured to sense a second image comprising a grey color and a second color based on light incident through the second lens,
    wherein the first image sensor comprises a first filter configured to pass the grey color and the first color, and the second image sensor comprises a second filter configured to pass the grey color and the second color,
    wherein the first filter comprises a plurality of first clear regions and a plurality of first color regions, and at least some of the plurality of first clear regions surround one of the plurality of first color regions,
    wherein the second filter comprises a plurality of second clear regions and a plurality of second color regions, and at least some of the plurality of second clear regions surround one of the plurality of second color regions,
    wherein locations of the plurality of second color regions in the second filter correspond to locations of the plurality of first color regions in the first filter.

16. The vehicle according to claim 15, further comprising an image processor configured to:
    generate a disparity map based on the first image and the second image; and
    generate an RGB image based on the generated disparity map, the first image, and the second image based on the first color being any one of RGB colors and the second color being another of the RGB colors.

17. The vehicle according to claim 15, further comprising at least one processor configured to detect a distance from a peripheral vehicle and a lane based on the first image and the second image,
    wherein the at least one processor is configured to:
        interpolate a grey image in the first image and acquire the interpolated first grey image,
        interpolate a grey image in the second image and acquire the interpolated second grey image,
        generate a disparity map based on the interpolated first grey image and the interpolated second grey image,
        generate a third color image based on a first color image in the first image, a second color image in the second image, and the disparity map, and
        generate an RGB image based on the first color image, the second color image, and the third color image.

* * * * *